United States Patent [19]

Jäger et al.

[11] Patent Number: 4,748,236

[45] Date of Patent: May 31, 1988

[54] AZO DYESTUFFS HAVING SULPHO ORTHO TO AZO BRIDGE AND CONTAINING TWO TRIAZINE REACTIVE GROUPS

[75] Inventors: Horst Jäger; Richard Schwaebel, both of Leverkusen, Fed. Rep. of Germany

[73] Assignee: Bayer Aktiengesellschaft, Leverkusen, Fed. Rep. of Germany

[21] Appl. No.: 670,434

[22] Filed: Nov. 9, 1984

Related U.S. Application Data

[60] Continuation of Ser. No. 177,559, Aug. 13, 1980, abandoned, which is a division of Ser. No. 40,853, May 21, 1979, abandoned.

[30] Foreign Application Priority Data

Jun. 10, 1978 [DE] Fed. Rep. of Germany ....... 2825594

[51] Int. Cl.[4] .................... C09B 62/08; C09B 62/085; C09B 62/09; C09B 62/095

[52] U.S. Cl. .................................... 534/634; 534/598; 534/624; 534/632; 534/638; 534/725; 534/827; 534/845

[58] Field of Search .......................... 260/153, 146 T; 534/638, 636, 635, 632, 634, 624

[56] References Cited

U.S. PATENT DOCUMENTS

| | | | |
|---|---|---|---|
| 3,474,084 | 10/1969 | Griffiths et al. | 260/153 |
| 3,497,494 | 2/1970 | Budziarek | 260/153 |
| 3,575,955 | 4/1971 | Andrew et al. | 260/153 |
| 3,627,749 | 12/1971 | Ackermann et al. | 260/153 |
| 4,049,704 | 9/1977 | Jager | 260/153 |

*Primary Examiner*—Floyd D. Higel

*Attorney, Agent, or Firm*—Sprung Horn Kramer & Woods

[57] ABSTRACT

Reactive azo dyestuffs of the formula

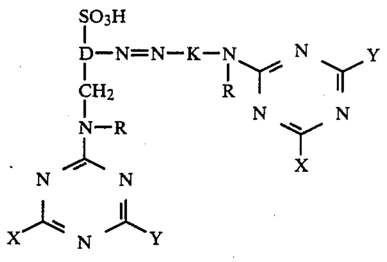

wherein

D . . . radical of the benzene or naphthalene series, having a sulpho group in the o-position to the azo bridge, K . . . radical of a coupling component of the benzene, naphthalene, pyridone, pyrazolone or hydroxynaphthalene series, or an aryl-azo-aryl radical, R . . . hydrogen or $C_1$–$C_4$-alkyl, Y . . . $OR_1$ or $SR_1$, $R_1$ representing an optionally substituted alkyl, aryl or heteroaryl radical, or $NR_2R_3$, $R_2$ representing hydrogen or an optionally substituted alkyl radical and $R_3$ representing hydrogen or an optionally substituted alkyl or aryl radical, or $R_2$ and $R_3$ forming a ring, optionally with inclusion of a hetero-atom, and X . . . halogen, such as chlorine or fluorine and their use for dyeing and printing materials containing hydroxyl groups or containing amide groups.

17 Claims, No Drawings

AZO DYESTUFFS HAVING SULPHO ORTHO TO AZO BRIDGE AND CONTAINING TWO TRIAZINE REACTIVE GROUPS

This is a continuation of application Ser. No. 177,559 filed Aug. 13, 1980 (abandoned) which is a division of Serial No. 040,853 filed May 21, 1979 (abandoned).

The invention relates to reactive azo dyestuffs of the formula (I)

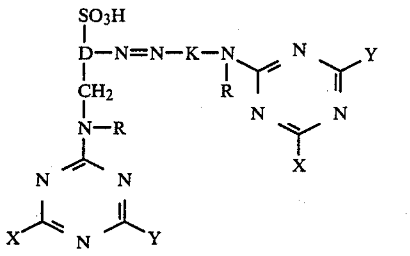

wherein

D . . . radical of the benzene or naphthalene series, having a sulpho group in the o-position to the azo bridge, K . . . radical of a coupling component of the benzene, naphthalene, pyridone, pyrazolone or hydroxynaphthalene series, or an aryl-azo-aryl radical, R . . . hydrogen or $C_1$–$C_4$-alkyl, Y . . . $OR_1$ or $SR_1$, $R_1$ representing an optionally substituted alkyl, aryl or heteroaryl radical, or $NR_2R_3$, $R_2$ representing hydrogen or an optionally substituted alkyl radical and $R_3$ representing hydrogen or an optionally substituted alkyl or aryl radical, or $R_2$ and $R_3$ forming a ring, optionally with inclusion of a hetero-atom, and X . . . halogen, such as chlorine or fluorine.

Examples of optionally substituted alkyl radicals $R_1$ are: methyl, ethyl, propyl, isopropyl, t-butyl, methoxymethyl, methoxyethyl and ethoxyethyl.

Examples of optionally substituted aryl radicals $R_1$ are: phenyl, 4-chlorophenyl or 4-methoxyphenyl.

Suitable alkyl radicals $R_2$ are the following: methyl, ethyl, propyl, isopropyl, n-butyl, cyclohexyl, hydroxyethyl, methoxyethyl, carboxymethyl, β-carboxyethyl and β-sulphoethyl.

Suitable alkyl radicals $R_3$ are the following: methyl, ethyl, propyl, isopropyl, hydroxyethyl and methoxyethyl.

Suitable aryl radicals $R_3$ are the following: phenyl, o-, m- and p-chlorophenyl, o-, m- and p-methoxyphenyl, o-, m- and p-methylphenyl, o-, m- and p-sulphophenyl, 2-methyl-4- or 5-sulphophenyl, 2-chloro-4- or 5-sulphophenyl, 2-methoxy-4- or 5-sulphophenyl, 2,5-disulphophenyl, 3,5-disulphophenyl, 2,5-disulpho-4-methoxyphenyl, 2-carboxyphenyl, 2-carboxy-4- or 5-sulphophenyl and 2-sulpho-4-methylphenyl.

Suitable ring systems of the formula $—NR_2R_3$ are the radicals of pyrollidine, piperidine or morpholine.

The following may be mentioned as examples of coupling components of the formula H-K-NRH:

(a) Pyridones: 1-(β-aminoethyl-)3-cyano-4-methyl-6-hydroxypyrid-2-one, 1-(β-aminoethyl-)3-carboxamido-4-methyl-6-hydroxy-pyrid-2-one, 1-(3'-aminophenyl)-3-carboxamido-4-methyl-6-hydroxy-pyrid-2-one, 1-(4'-aminophenyl)-3-carboxamido-4-methyl-6-hydroxy-pyrid-2-one, 1-(3'-aminophenyl)-4-methyl-6-hydroxy-pyrid-2-one and 1-(3'-aminophenyl)-3-sulphomethyl-4-methyl-6-hydroxy-pyrid-2-one.

(b) Pyrazolones: 1-(2'-methyl-3'-amino-5'-sulphophenyl)-3-methyl-pyrazol-5-one, 1-(2'-methyl-3'-amino-5'-sulphophenyl)-3-carboxy-pyrazol-5-one, 1-(3'- or 4'-aminophenyl)-3-methylpyrazol-5-one, 1-(3'- or 4'-aminophenyl)-3-carboxy-pyrazol-5-one and 1-(2'-sulpho-4'-aminophenyl)-3-methyl-pyrazol-5-one.

(c) Aminobenzenes: aniline, m-toluidine, N-methylaniline, 3-methyl-6-methoxy-aniline, 3-ureido-aniline and 3-acetylamino-aniline.

(d) Aminonaphthalenes: 1-amino-6-, 7- or 8-sulphonaphthalene, 1-amino-2-ethoxy- or methoxy-6-sulphonaphthalene and 1-amino-6,8-disulpho-naphthalene.

(e) Aminohydroxynaphthalenes: 1-amino-8-hydroxy-naphthalene-3,6-disulfphonic acid, 1-amino-8-hydroxy-naphthalene-4,6-disulphonic acid, 2-amino-5-hydroxy-naphthalene-7-sulphonic acid, 2-amino-5-hydroxy-naphthalene-1,7-disulphonic acid, 2-amino-8-hydroxy-naphthalene-6-sulphonic acid and 2-amino-8-hydroxy-naphthalene-3,6-disulphonic acid.

Examples of radicals of the aryl-azo-aryl series, of the formula —K— are, for example, the following:

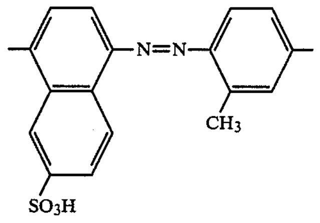

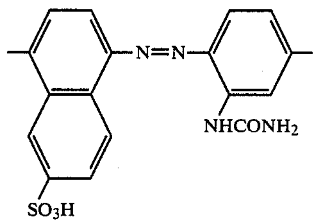

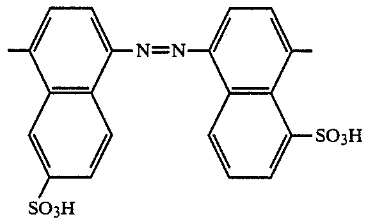

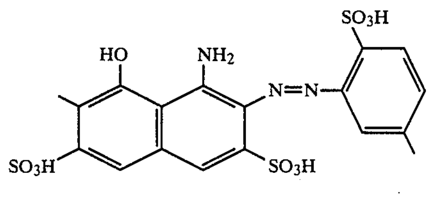

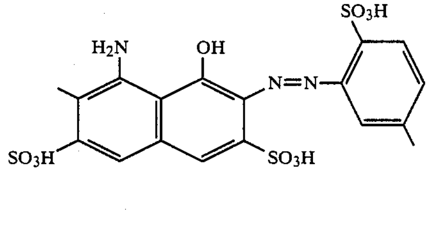 and

-continued

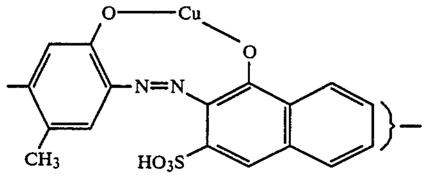

The radical K can optionally be metallised. Preferred metals are copper, chromium and cobalt.

Within the scope of the formula I, the following dyestuffs are preferred:

II

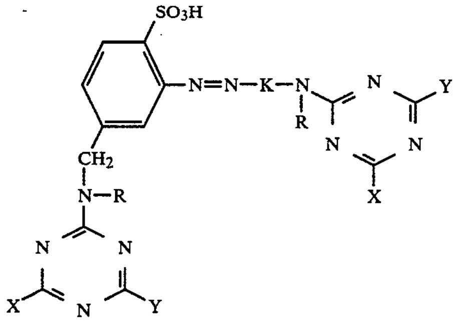

wherein K, R, X and Y have the abovementioned meaning,

III

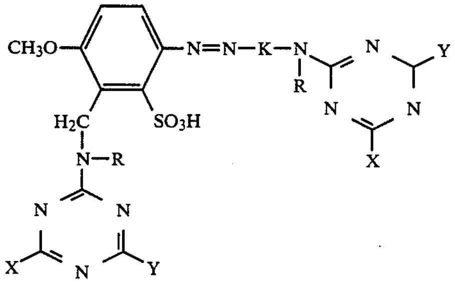

wherein K, R, X and Y have the abovementioned meaning,

IV

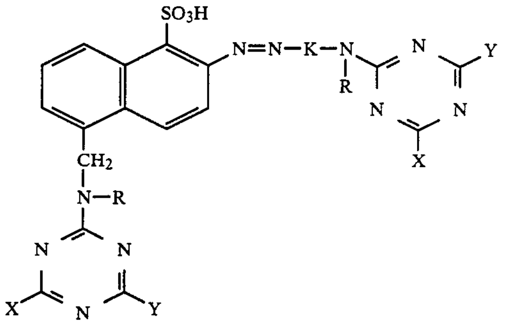

wherein K, R, X and Y have the abovementioned meaning. Particularly preferred dyestuffs are those listed below:

V

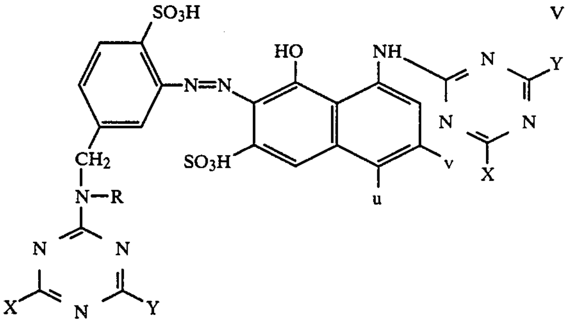

wherein

R, X and Y have the abovementioned meaning and u and v represent hydrogen or a sulpho group, but u≠v,

VI

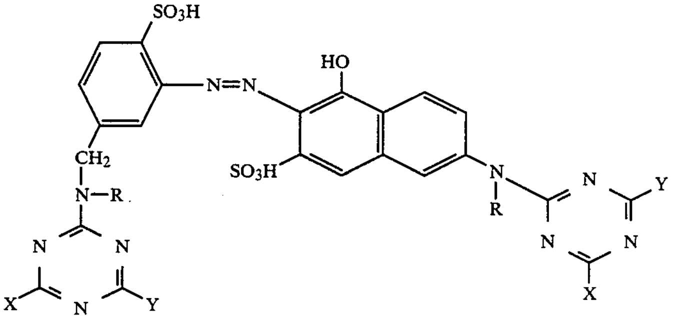

wherein R, X and Y have the abovementioned meaning,

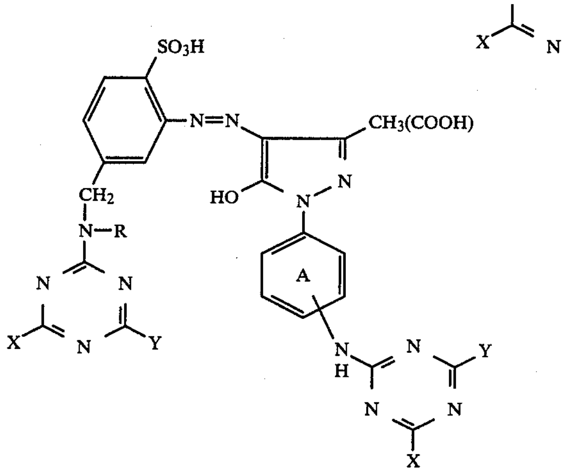

wherein R, X and Y have the abovementioned meaning and the ring A may contain further substituents, such as chlorine atoms, methyl groups or sulpho groups,

VIII wherein
R, X and Y have the abovementioned meaning and u and v represent hydrogen or a sulpho group, but u≠v,

VII

IX

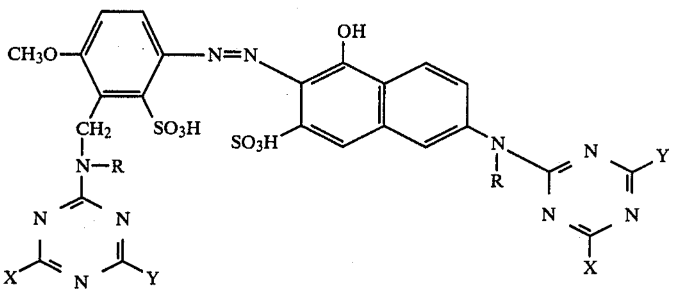

wherein R, X and Y have the abovementioned meaning,

X

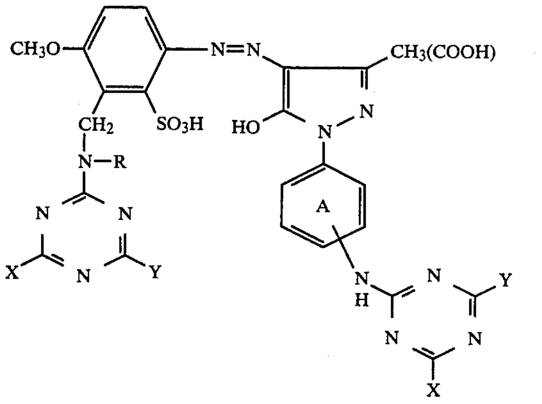

wherein R, X and Y have the abovementioned meaning and the ring A may contain further substituents, such as chlorine atoms, methyl groups or sulpho groups,

XI

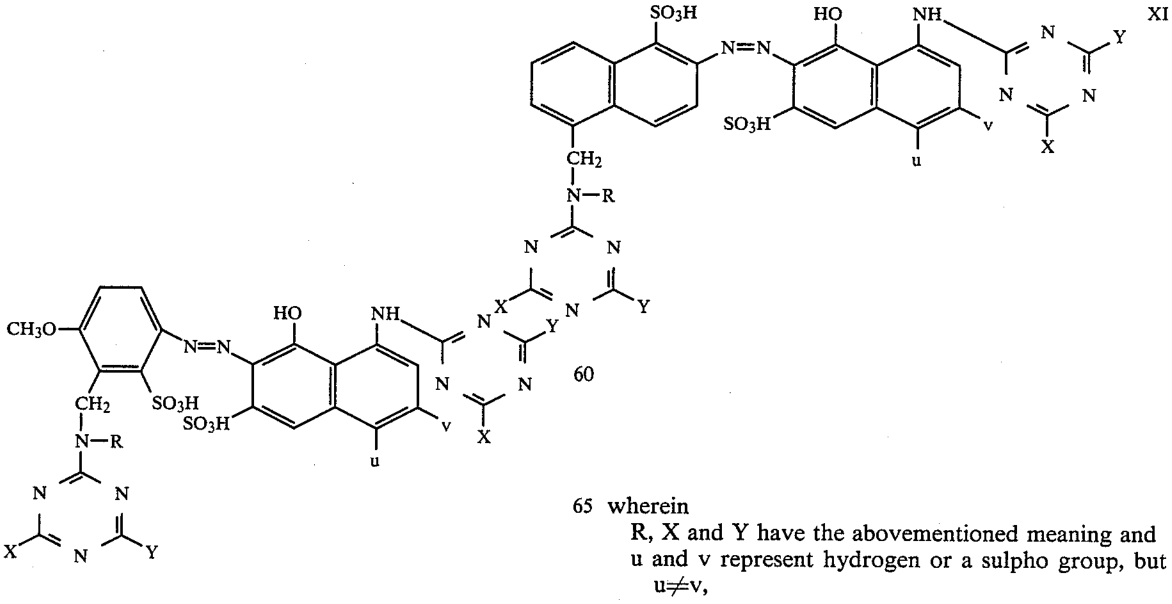

wherein
R, X and Y have the abovementioned meaning and u and v represent hydrogen or a sulpho group, but u≠v,

XII

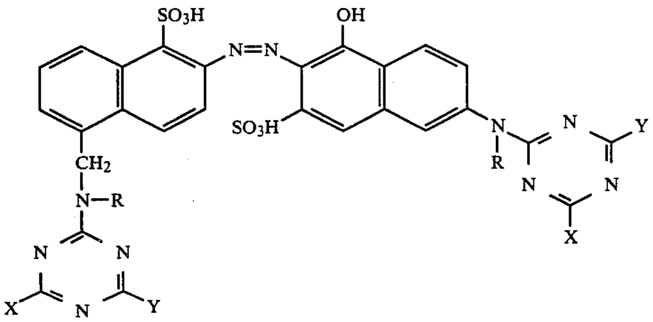

wherein R, X and Y have the abovementioned meaning,

XIII

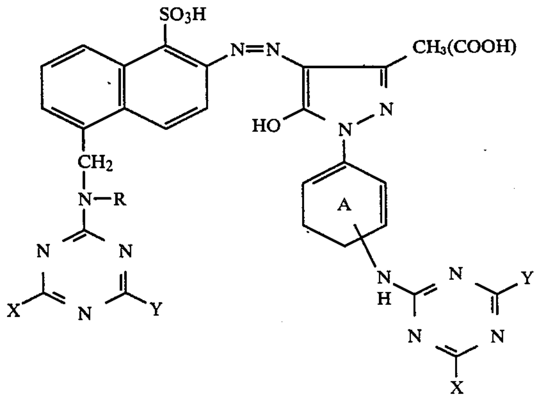

wherein R, X and Y have the abovementioned meaning and the ring A may contain further substituents, such as chlorine atoms, methyl groups or sulpho groups,

XIV

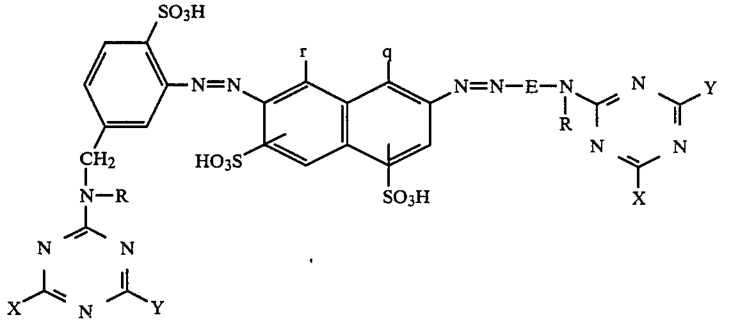

wherein

R, X and Y have the meaning mentioned, and
r and q represent an OH or $NH_2$ group, but $r \neq q$ and
E represents a monosulpho- or disulpho-phenylene or -naphthylene radical,

XV

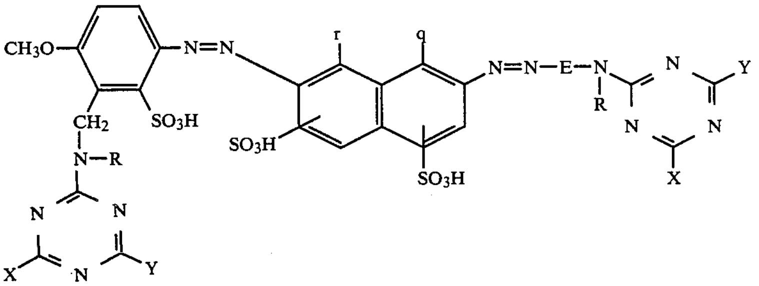

wherein

R, X and Y have the meaning mentioned and
r and q represent an OH or $NH_2$ group, but $r \neq q$ and
E represents a monosulpho- or disulpho-phenylene or -naphthylene radical, and

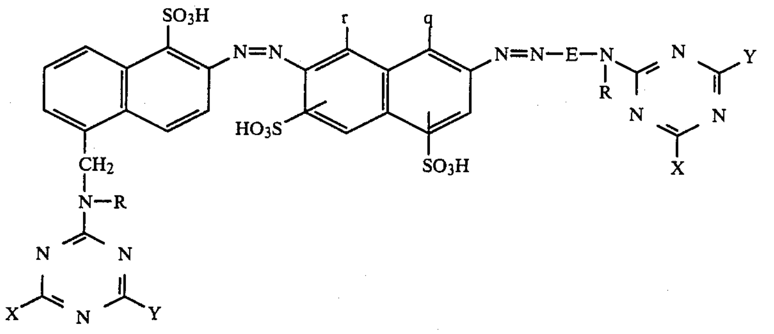

XVI wherein

R, X and Y have the meaning mentioned and r and q represent an OH or $NH_2$ group, but $r \neq q$ and E represents a monosulpho- or disulpho-phenylene or -naphthylene radical.

Preferred radicals R in the formulae I-XVI are H and $CH_3$.

Examples of compounds of the formula

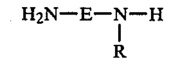

are: 1,4-diaminobenzene-2-sulphonic acid, 1,3-diaminobenzene-4-sulphonic acid, 1,4-diaminobenzene-2-carboxylic acid, 1,3-diamino-2-methyl-benzene-5-sulphonic acid, 2,6-diamino-naphthalene-4,8-disulphonic acid and 1,4-diamino-2,5-disulphobenzene.

Further preferred compounds are those of the formula I-XVI, wherein

X represents chlorine and

Y represents $-NR_2R_3$, $R_2$ and $R_3$ having the abovementioned meaning, and compounds of the formula I-XVI, wherein X represents chlorine and Y represents $-NHR_4$, $R_4$ representing hydrogen or a sulphophenylamino group, as well as compounds I-XVI, wherein X represents chlorine and Y represents $-OR_5$, $R_5$ being optionally substituted alkyl, preferably $C_1$–$C_4$-alkyl, in particular those in which one $Y=OR_5$ and the other $Y=-NHR_4$ or $-NR_2R_3$.

The invention further relates to processes for the preparation of the compounds of the formula I. The following variants may be mentioned specifically.

(1) Amines of the formula

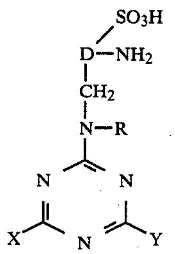

XVII wherein D, R, Y and X have the abovementioned meaning, are diazotised and combined with azo components of the formula

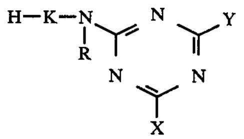

XVIII wherein K, R, Y and X have the abovementioned meaning.

(2) Azo dyestuffs of the formula

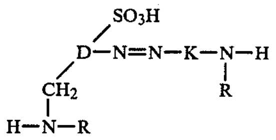

IXX wherein D, K and R have the abovementioned meaning are condensed with 2 mols of dihalogenotriazine of the formula

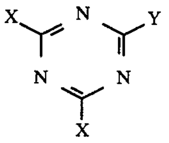

XX wherein Y and X have the abovementioned meaning, with elimination of 2 mols of HX.

(3) Azo dyestuffs of the formula

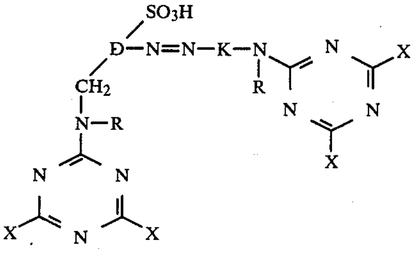

XXI wherein D, K, R and X have the abovementioned meaning are condensed with 2 mols of HY, Y having the abovementioned meaning, with elimination of 2 mols of HX.

(4) Azo dyestuffs of the formula

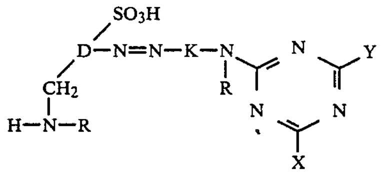

XXII wherein D, K, R, Y and X have the abovementioned meaning are condensed with 1 mol of dihalogenotriazine of the formula XX, with elimination of 1 mol of HX.

(5) Azo dyestuffs of the formula

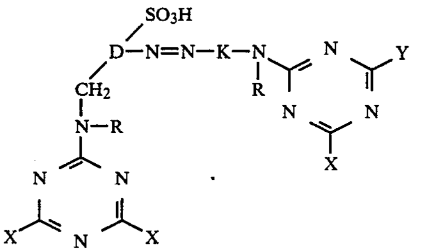

XXIII wherein D, K, R and X have the abovementioned meaning are condensed with 1 mol of HY, with elimination of 1 mol of HX.

(6) Azo dyestuffs of the formula

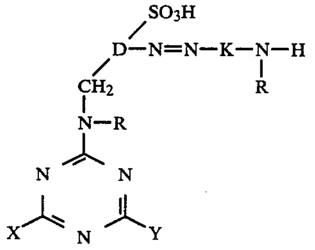

XXIV wherein D, K, R, Y and X have the abovementioned meaning are condensed with 1 mol of dihalogenotriazine of the formula XX, with elimination of 1 mol of HX.

(7) Azo dyestuffs of the formula

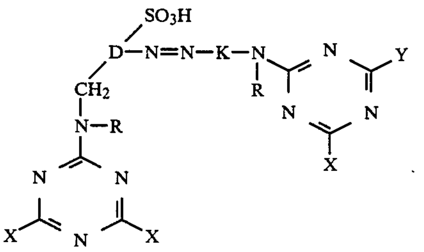

XXV wherein D, K, R, Y and X have the abovementioned meaning are condensed with 1 mol of HY, with elimination of 1 mol of HX.

(8) Azo dyestuffs of the formula

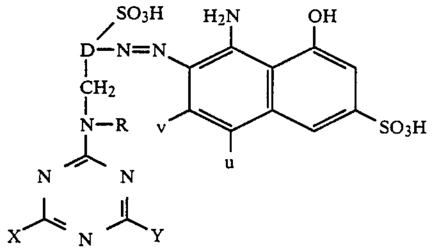

XXVI wherein D, X, Y, u, v and R have the abovementioned meaning are coupled with diazo compounds of amines of the formula

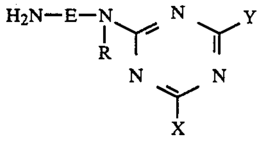

wherein

R, X and Y have the abovementioned meaning and

E represents a monosulpho- or disulpho-phenylene or -naphthylene radical.

Examples of suitable dichlorotriazines of the formula XX are the following: 2,6-dichloro-4-amino-triazine, 2,6-dichloro-4-methylaminotriazine, 2,6-dichloro-4-ethylaminotriazine, 2,6-dichloro-4-hydroxyethylamino-triazine, 2,6-dichloro-4-phenylamino-triazine, 2,6-dichloro-4-(o-, m- or p-sulphophenyl)-aminotriazine, 2,6-dichloro-4-(2′,5′-, 2′,4′- or 3′,5′-disulphophenyl)-aminotriazine, 2,6-dichloro-4-(2′-methyl-4′-sulphophenyl)-aminotriazine, 2,6-dichloro-(2′-chloro-4′-sulphophenyl)-aminotriazine, 2,6-dichloro-(2′-methyl-5′-sulphophenyl)-aminotriazine, 2,6-dichloro-2′-methoxy-5′-sulphophenyl)-aminotriazine, 2,6-dichloro-(2′,5′-disulpho-4′-methoxyphenyl)-aminotriazine, 2,6-dichloro-(4′,8′-disulphonaphth-2′-yl)-aminotriazine, dichloro-alkoxy- and aryloxy-sym.-triazines, such as 2,6-dichloro-4-methoxytriazine, 2,6-dichloro-4-ethoxytriazine, 2,6-dichloro-4-phenoxytriazine and 2,6-dichloro-4-(o-, m- or p-sulphophenyl)-hydroxytriazine, and dichloro-alkyl-mercapto- and -arylmercapto sym.-triazines, such as 2,6-dichloro-4-ethylmercapto-triazine, 2,6-dichloro-4-phenylmercaptotriazine, 2,6-dichloro-4-(p-methylphenyl)-mercaptotriazine and 2,6-dichloro-4-methoxyethoxytriazine.

Examples of suitable difluorotriazines of the formula XX are the following: 2,6-difluoro-4-amino-triazine, 2,6-difluoro-4-methylaminotriazine, 2,6-difluoro-4-ethylaminotriazine, 2,6-difluoro-4-hydroxyethylamino-triazine, 2,6-difluoro-4-phenylamino-triazine, 2,6-difluoro-4-(o-, m- or p-sulphophenyl)-aminotriazine, 2,6-difluoro-4-(2′,5′-, 2′,4′- or 3′,5′-disulphophenyl)-aminotriazine, 2,6-difluoro-4-(2′-methyl-4′-sulphophenyl)-aminotriazine, 2,6-difluoro-(2′-chloro-4′-sulphophenyl) minotriazine, 2,6-difluoro-(2′-methyl-5′-sulphophenyl aminotriazine, 2,6-difluoro-(2′-methoxy-5′-sulphophenyl -aminotriazine, 2,6-difluoro-(2′,5′-disulpho-4′-methoxyphenyl)-aminotriazine, 2,6-difluoro-(4′,8′-disulphonaphth-2′-yl)-aminotriazine, difluoro-alkoxy- and aryloxy-sym.-triazines, such as 2,6-difluoro-4-methoxytriazine, 2,6-difluoro-4-ethoxytriazine, 2,6-difluoro-4-phenoxytriazine and 2,6-difluoro-4-(o-, m- or p-sulphophenyl)-oxytriazine, and difluoro-alkyl-mercapto- and -arylmercapto-sym.-triazines, such as 2,6-difluoro-4-ethylmercapto-triazine, 2,6-difluoro-4-phenylmercaptotriazine, 2,6-difluoro-4-(p-methylphenyl)-mercaptotriazine and 2,6-difluoro-4-methoxyethoxytriazine.

The dihalogenotriazines of the formula XX can be prepared in accordance with methods which are in themselves known, for example by reacting 1 mol of cyanuric chloride or cyanuric fluoride with 1 mol of HY. Examples of suitable compounds of this type are: aliphatic or aromatic mercapto compounds or hydroxyl compounds, such as thioalcohols, thioglycolic acid, thiourea, thiophenols, mercaptobenzthiazoles, methyl alcohol, ethyl alcohol, isopropyl alcohol, glycolic acid, phenol, chlorophenols or nitrophenols, phenolcarboxylic acids and phenylsulphonic acids, naphthols and naphtholsulphonic acids, but especially ammonia and compounds which contain amino groups which can be acylated, such as hydroxylamine, hydrazine, phenylhydrazine, phenylhydrazinesulphonic acids, carbamic acid and its derivatives, semicarbazides, thiosemicarbazides, semicarbazones and thiosemicarbazones, methylamine, ethylamine, isopropylamine, methoxyethylamine, methoxypropylamine, dimethylamine, diethylamine, methylphenylamine, ethylphenylamine, chloroethylamidn, ethanolamines, propanolamines, benzylamine, cyclohexylamine, morpholine, piperidine, piperazine, aminocarbonic acid esters, ethyl aminoacetate, aminoethanesulphonic acid and N-methylaminoethanesulphonic acid, but above all aromatic amines, such as aniline, N-methylaniline, toluidines, xylidines, chloroanilines, p- and m-aminoacetanilide, nitroanilines, aminophenols, nitrotoluidines, phenylenediamines, toluylenediamines, anisidine, phenetidine, diphenylamine, naphthylamine, aminonaphthols, diaminonaphthalenes and, especially, anilines containing acid groups, such as sulphanilic acid, metanilic acid, orthanilic acid, anilinedisulphonic acids, aminobenzoic acid, naphthylaminemonosulphonic, -disulphonic and -trisulphonic acids, aminobenzoic acids, such as 1-hydroxy-5-aminobenzoic acid, and aminonaphthol-monosulphonic, -disulphonic and -trisulphonic acids.

The condensation of XX with the dyestuffs of the formulae IXX, XXII and XXIV is carried out in accordance with methods which are in themselves known, advantageously in the presence of acid-binding agents such as sodium acetate, sodium hydroxide or sodium carbonate and under such conditions that a replaceable halogen atom still remains in the finished product, that is to say in an aqueous medium at relatively low to moderately elevated temperatures.

If the reaction is first carried out with cyanuric chloride or cyanuric fluoride it is necessary, as already mentioned, to convert the dichlorotriazine or difluorotriazine compound, first formed, into a monohalogenotriazine compound by subsequent replacement of a further halogen atom by one of the radicals defined as Y in formula I. In this method of preparation, suitable reactants are, in this context, the abovementioned mercapto, hydroxyl and amino compounds, and the reaction conditions are preferably also selected as mentioned above.

The new dyestuffs of the formula I can be used for dyeing and printing materials containing hydroxyl groups or containing amide groups, such as textile fibres, yarns and fabrics consisting of wool, silk, synthetic polyamide and synthetic polyurethane fibers, and especially for the wash-fast dyeing and printing of natural or regenerated cellulose, the treatment of cellulose materials advantageously being carried out in the presence of acid-binding agents and, if necessary, with exposure to heat, in accordance with the processes which have been disclosed for reactive dyestuffs.

As a result of the presence of two monohalogenotriazine groups per dyestuff molecule, high fixing yields are achieved. This does not only mean better utilisation of the available dyestuff, but also that the amount of dyestuff washed out after fixing is reduced and hence the washing-out process is also facilitàted.

The formulae shown for the dyestuffs are those of the corresponding free acids. The dyestuffs are in general isolated, and employed for dyeing, in the form of the alkali metal salts, especially of the Na salts or K salts.

The weights mentioned in the examples relate to the free acid.

EXAMPLE 1

50 g of the secondary condensation product of 1 mol of cyanuric chloride, 1 mol of m-sulphanilic acid and 1 mol of 3-amino-4-sulpho-N-methyl-benzylamine are stirred with 1 liter of ice water and 28 ml of concentrated hydrochloric acid, and the mixture is diazotised at 0°–2° C. with 70 ml of a 10% strength by volume sodium nitrite solution. After removing the excess nitrite present by means of amidosulphonic acid, the diazo suspension obtained is introduced into a mixture of 50.4 g of the secondary condensation product of 1 mol of cyanuric chloride, 1 mol of 1-amino-8-hydroxynaphthalene-4,6-disulphonic acid and 1 mol of m-sulphanilic acid, and 28 g of sodium bicarbonate in 500 ml of water. After completion of coupling, separating-out of the dyestuff is completed by adding potassium chloride. After filtering, drying at 70° C. in a circulating air drying cabinet, and grinding, a red powder is obtained, which readily dissolves in water, giving a yellowish-tinged red colour.

In the form of the free acid, the dyestuff corresponds to the formula:

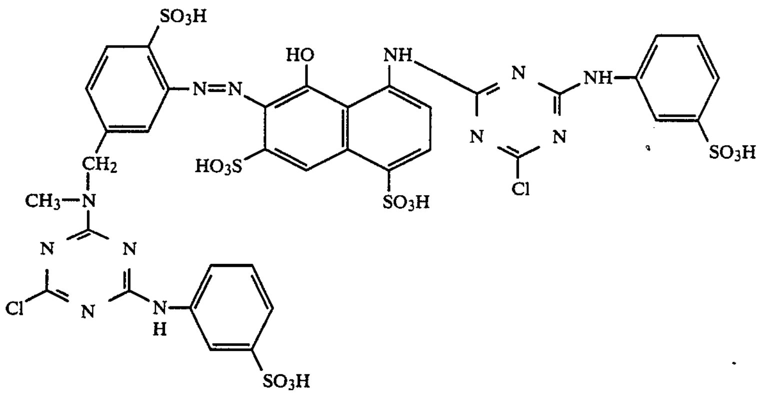

Use Examples

Dyeing instructions 2 g of dyestuff of Example 1 are dissolved in 100 ml of water. A cotton fabric is impregnated with this solution on a padder and the excess liquid is squeezed out so that the fabric retains 75% of its weight of dyestuff solution. The goods impregnated in this way are dried, then impregnated at room temperature with a solution which contains 10 g of sodium hydroxide and 300 g of sodium chloride per liter, squeezed out to 75% liquid pick-up and steamed for 90 seconds at 100° to 101°. The fabric is then rinsed, soaped for quarter of an hour in an 0.3% strength solution of a non-ionic detergent at the boil, rinsed and dried.

A clear yellowish-tinged red dyeing having very good wet fastness and light fastness is obtained.

It is also possible to operate in accordance with the following instructions: 2 g of dyestuff, 2 g of sodium carbonate and 25 g of urea are dissolved in 75 ml of water; a cotton fabric is impregnated with the solution obtained, squeezed out to 75% weight increase and then dried at 90° to 100°. The dry fabric is then exposed to dry heat at 140° for 5 minutes, rinsed, soaped, again rinsed and dried. This again gives a wash-fast clear yellowish-tinged red coloration.

Printing instructions 30 g of the dyestuff of Example 1 are dissolved in 339 ml of water and 200 g of urea, the solution is poured into 400 g of an approximately 5% strength sodium alginate thickener, and 30 g of potassium carbonate and 1 g of sodium hydroxide of 36° Bé strength are added. A cotton fabric is printed in the usual manner with the printing ink thus obtained, and is dried. It is then steamed for 8 minutes at 100° to 101°, rinsed, soaped, again rinsed and dried. A clear yellowish-tinged red print, having good wet fastness and light fastness, results.

Following the procedure of Example 1, the diazo components mentioned in column 1 of the table which follows, when coupled with the coupling components indicated in column 2, yield similar dyestuffs, which, using one of the processes mentioned, give wet-fast dyeings, in the shades shown in column 3, on cotton.

| Example | Column 1 | Column 2 | Column 3 |
|---|---|---|---|
| 2 | 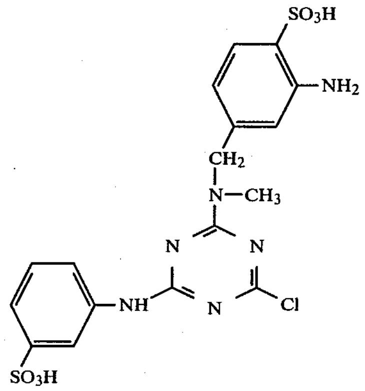 | 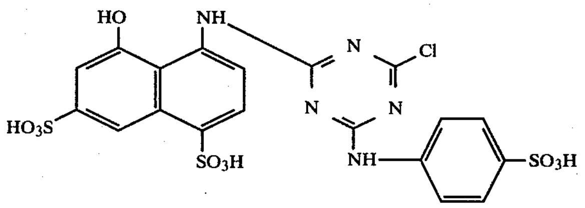 | yellowish-tinged red |
| 3 | 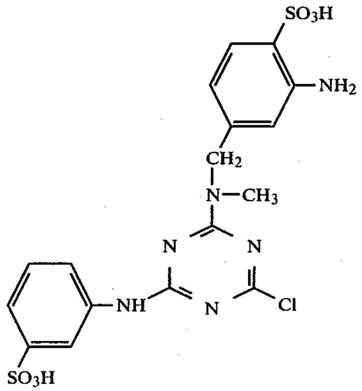 | 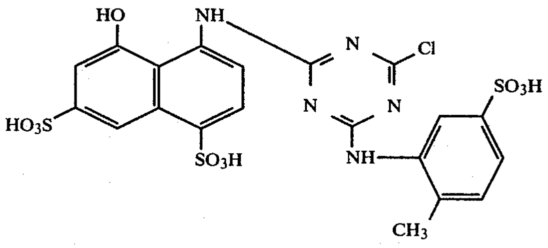 | yellowish-tinged red |

-continued
| Example | Column 1 | Column 2 | Column 3 |
| --- | --- | --- | --- |
| 4 | 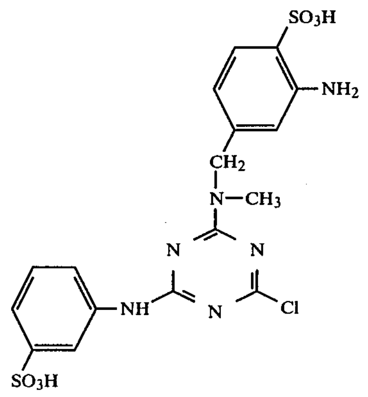 | 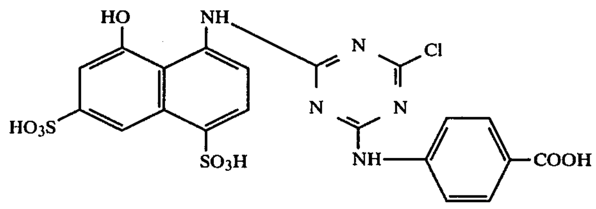 | yellowish-tinged red |
| 5 | 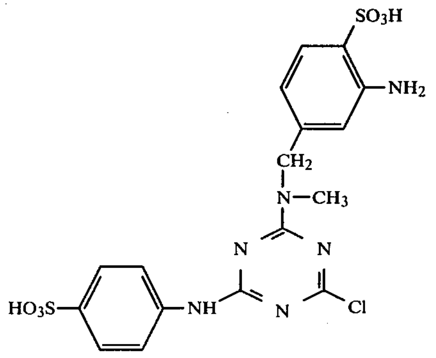 | 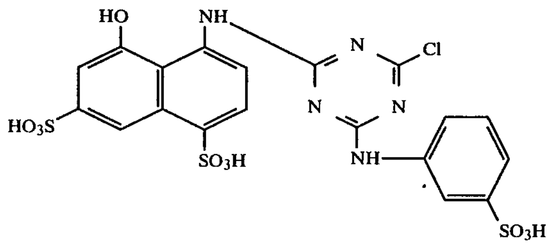 | yellowish-tinged red |

-continued
| Example | Column 1 | Column 2 | Column 3 |
| --- | --- | --- | --- |
| 6 | 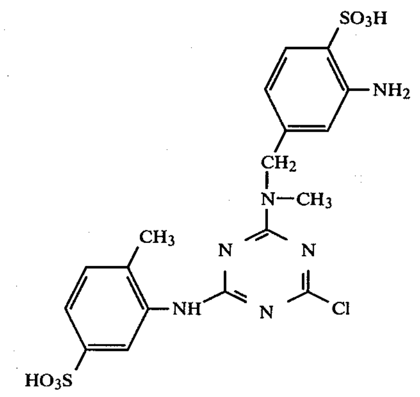 | 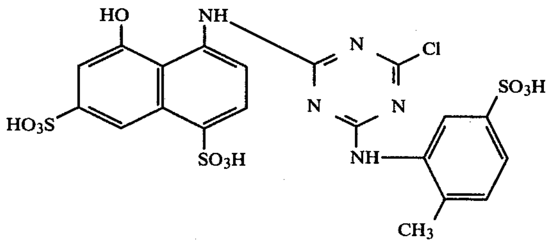 | yellowish-tinged red |
| 7 | 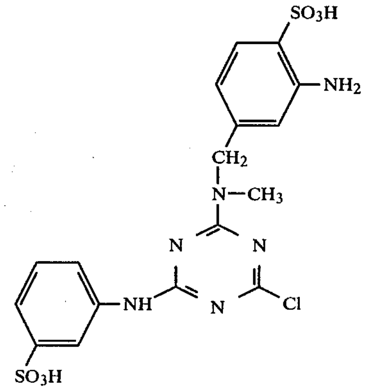 | 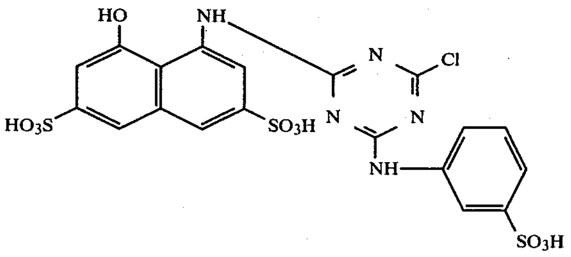 | bluish-tinged red |

-continued
| Example | Column 1 | Column 2 | Column 3 |
| --- | --- | --- | --- |
| 8 | 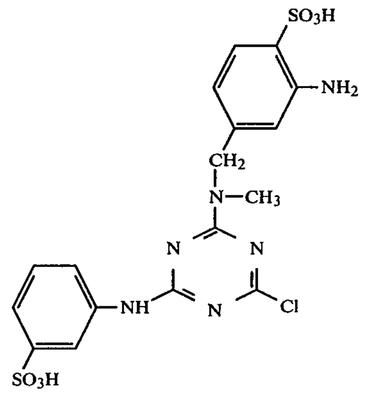 | 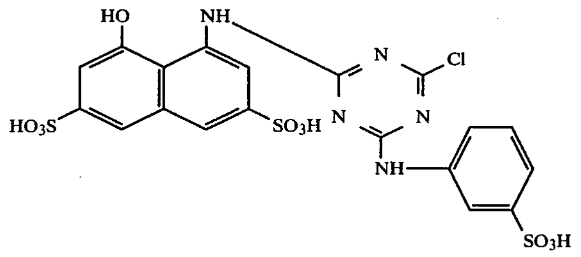 | bluish-tinged red |
| 9 | 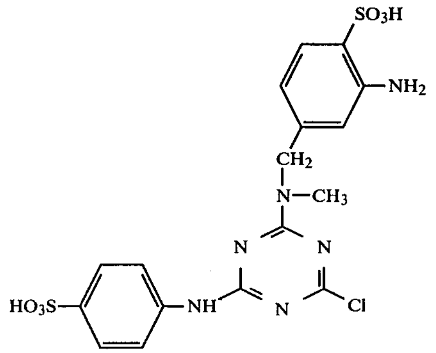 | 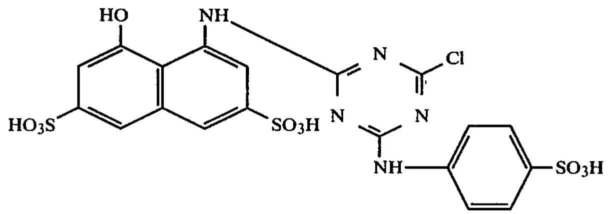 | bluish-tinged red |

-continued
| Example | Column 1 | Column 2 | Column 3 |
| --- | --- | --- | --- |
| 10 | 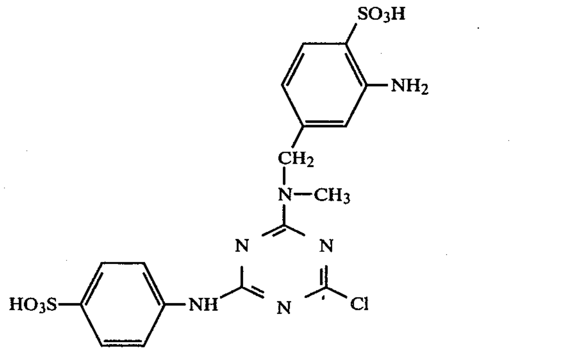 | 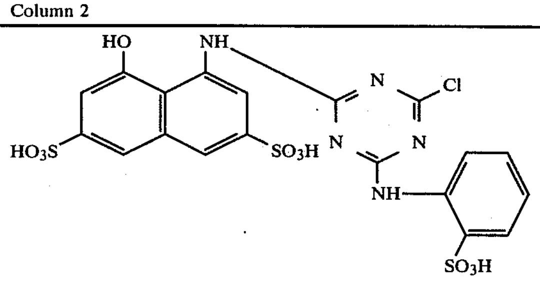 | bluish-tinged red |
| 11 | 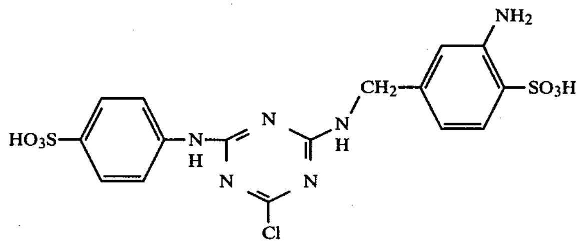 | 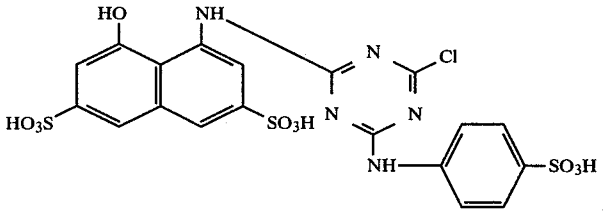 | bluish-tinged red |

EXAMPLE 12

21.6 g of 3-amino-4-sulpho-N-methyl-benzylamine are stirred with 300 ml of ice water and 28 ml of concentrated hydrochloric acid, and 70 ml of a 10% strength by volume sodium nitrite solution are added dropwise at 0° C. After removing the excess nitrite present with amidosulphonic acid, the diazotisation batch is introduced into a mixture of 50.4 g of the secondary condensation product of 1 mol of cyanuric chloride, 1 mol of 1-amino-8-hydroxy-naphthalene-4,6-disulphonic acid and 1 mol of m-sulphanilic acid, and 28 g of sodium bicarbonate in 500 ml of water. After completion of coupling, 18.5 g of cyanuric chloride are sprinkled into the mixture and the acylation is carried out at 5° and pH 8.5, the latter being maintained by adding 2N sodium hydroxide solution. After completion of the condensation, 17.3 g of m-sulphanilic acid were added, the mixture was warmed to 45°–50° and the hydrochloric acid split off was neutralised with 10% strength sodium carbonate solution. The dyestuff obtained on completion of the condensation is salted out with potassium chloride, filtered off, dried and ground.

It is identical with the product obtained according to Example 1.

EXAMPLE 13

21.6 g of 3-amino-4-sulpho-N-methyl-benzylamine are stirred with 300 ml of ice water and 28 ml of concentrated hydrochloric acid, and 70 ml of a 10% strength by volume sodium nitrite solution are added dropwise at 0° C. After removing the excess nitrite present with amidosulphonic acid, the diazotisation batch is introduced into a mixture of 50.4 g of the secondary condensation product of 1 mol of cyanuric chloride, 1 mol of 1-amino-8-hydroxy-naphthalene-4,6-disulphonic acid and 1 mol of m-sulphanilic acid, and 28 g of sodium bicarbonate in 500 ml of water. After completion of the coupling reaction, 32.1 g of the primary condensation product of 1 mol of cyanuric chloride and 1 mol of m-sulphanilic acid are added. The mixture is then warmed to 20°–25° C. and the hydrochloric acid liberated is neutralised with 10% strength sodium carbonate solution, so that a pH of 8.5 results. After completion of condensation, the dyestuff is separated out by means of potassium chloride, filtered off, dried and ground. It is identical with the product obtained according to Example 1.

EXAMPLE 14

46.7 g of the primary condensation product of 1 mol of cyanuric chloride and 1 mol of 1-amino-8-hydroxynaphthalene-4,6-disulphonic acid are added to the ice-cold diazo suspension obtainable, in accordance with the instructions of Example 1, from 50 g of the secondary condensation product of 1 mol of cyanuric chloride, 1 mol of m-sulphanilic acid and 1 mol of 3-amino-4-sulpho-N-methyl-benzylamine. The pH is then adjusted to 5–5.5 with 10% strength sodium carbonate solution. After completion of the coupling reaction, 12% strength ammonia solution is added dropwise, the mixture is warmed to 30°–35° and a pH of 8.5 to 9 is maintained. After completion of the condensation, the dyestuff is separated out by adding potassium chloride, filtered off, dried at 70° in a circulating air drying cabinet and ground. The resulting red powder easily dissolves in water, giving a yellowish-tinged red colour, and, when used according to one of the application methods mentioned, gives clear yellowish-tinged red dyeings or prints on cotton. In the form of the free acid, the dyestuff corresponds to the formula

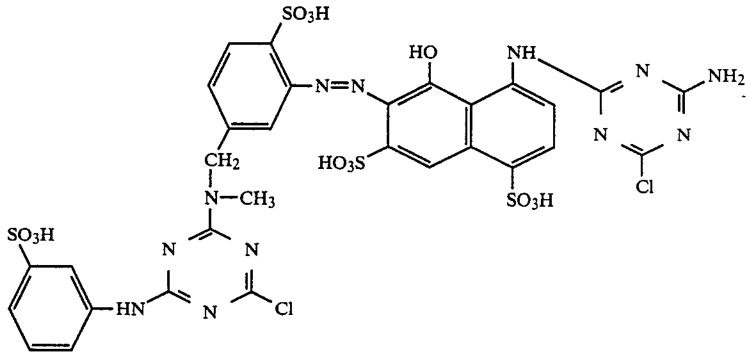

If instead of ammonia one of the amines mentioned is used and in other respects the procedure described is followed, valuable dyestuffs are again obtained, which dye cotton, in accordance with one of the application methods mentioned, in clear yellowish-tinged red colour shades.

The relevant amines are methylamine, ethylamine, isopropylamine, cyclohexylamine, ethanolamine, diethanolamine, morpholine and others.

EXAMPLE 15

The diazo suspension obtainable, in accordance with the instructions of Example 1, from 50 g of the secondary condensation product with 1 mol of cyanuric chloride, 1 mol of m-sulphanilic acid and 1 mol of 3-amino-4-sulpho-N-methylbenzylamine is added, at 30° C., to a mixture of 52.4 g of the secondary condensation product of 1 mol of cyanuric chloride, 1 mol of 2-amino-5-hydroxynaphthalene-7-sulphonic acid and 1 mol of m-sulphanilic acid, and 400 ml of water, a pH of between 5 and 6 being maintained by simultaneous dropwise addition of 10% strength sodium carbonate solution. After completion of the coupling reaction, the dyestuff is salted out at pH 9 by means of sodium chloride, and is filtered off, dried at 70° and ground. The powder readily dissolves in water, giving a yellowish-tinged orange colour, and, when used in accordance with one of the application methods mentioned, gives clear yellowish-tinged orange shades on cotton. In the form of the free acid, the dyestuff corresponds to the formula

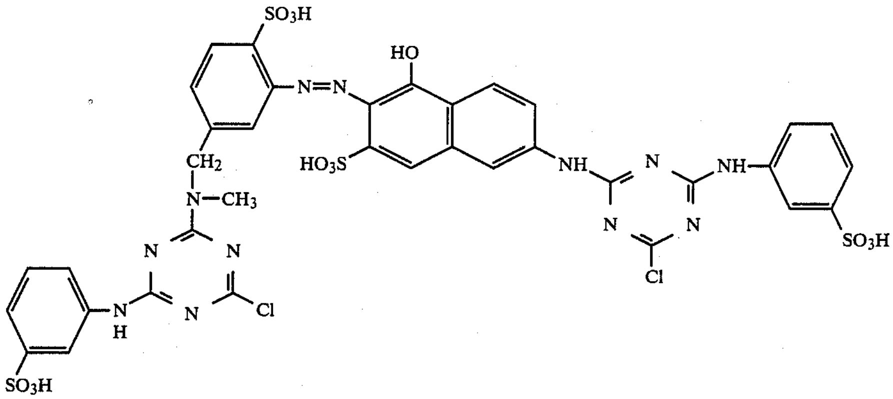
Following the procedure of Example 14, the secondary condensation compounds mentioned in column 1 of the table which follows, when coupled with the azo components mentioned in column 2, give similar dyestuffs, which dye cotton, in accordance with one of the methods mentioned, in yellowish-tinged orange shades.
| Example | Column | Column 2 |
|---|---|---|
| 16 | 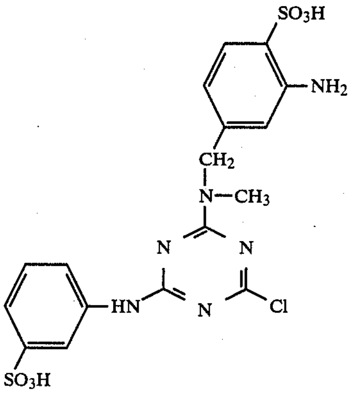 | 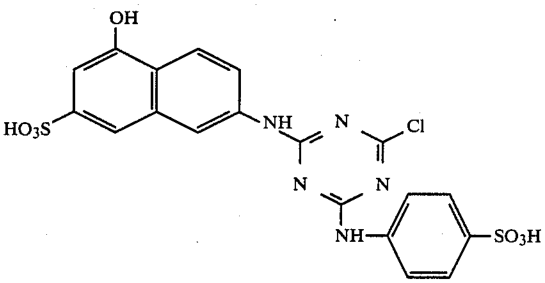 |
| 17 | 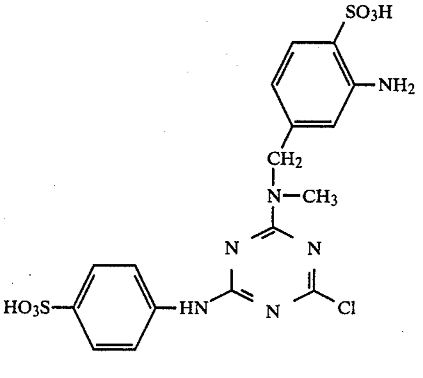 | 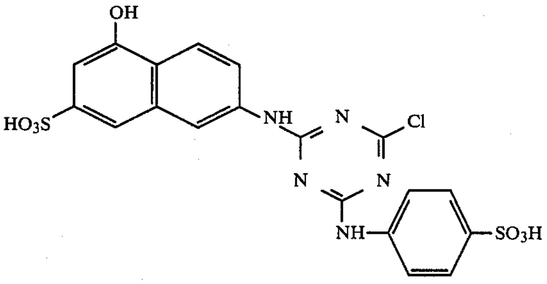 |

-continued

| Example | Column | Column 2 |
| --- | --- | --- |
| 18 | 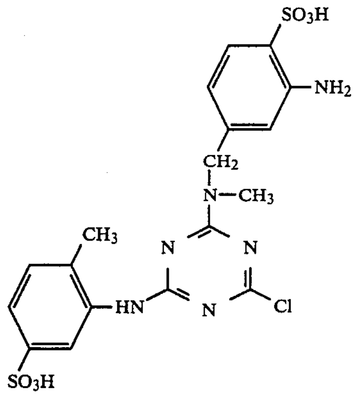 | 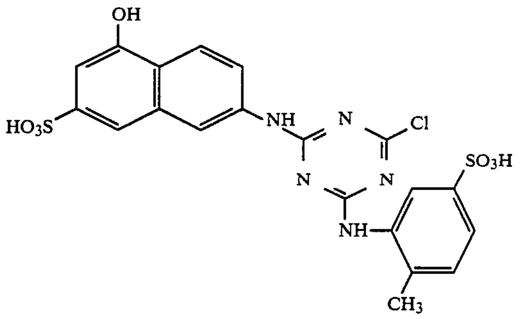 |
| 19 | 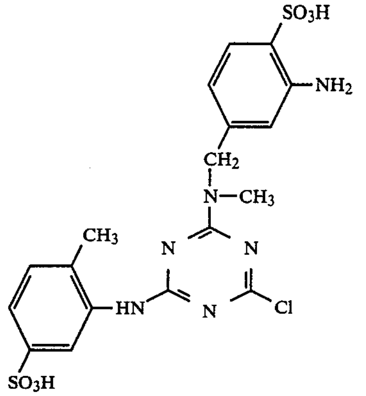 | 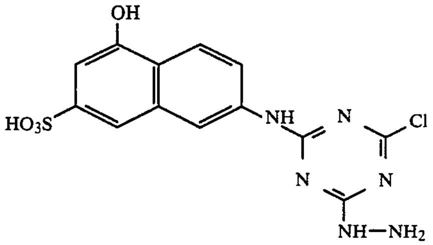 |

EXAMPLE 20

46.6 g of the monoazo dyestuff 2-sulpho-5-N-methylaminomethyl-benzene-<1 azo 2>-1-hydroxy-3-sulpho-6-aminonaphthalene, in 500 ml of water, are condensed with 64.2 g of the primary condensation product of 1 mol of cyanuric chloride and 1 mol of m-sulphanilic acid at 45°-50° C.,· in the pH range of 7-8.5. After completion of the acylation, the dyestuff is salted out, filtered off, dried at 70° C. and ground.

It is identical with the product obtained according to Example 15.

EXAMPLE 21

50 g of the secondary condensation product of 1 mol ofcyanuric chloride, 1 mol of m-sulphanilic acid and . . . 3-amino-4-sulpho-N-methyl-benzylamine are stirred with 1 liter of ice water and 28 ml of concentrated hydrochloric acid, and diazotised . . . sodium nitrite solution. After removing the excess nitrite present with amidosulphonic acid, the diazo suspension obtained is introduced into a mixture of 56.8 g of the secondary condensation product of 1 mol of cyanuric chloride, 1 mol of 1-(2'-methyl-5'-sulpho-3'-aminophenyl)-3-methyl-pyrazol-5-one and 1 mol of m-sulphanilic acid, and 28 g of sodium bicarbonate in 400 ml of ice water. After completion of the coupling reaction, the dyestuff is salted out with sodium chloride, filtered off, dried at 70°-80° C. and ground. The dyestuff is readily soluble in water, giving a yellow colour, and when used in accordance with one of the methods recommended in conjunction with Example 1, gives greenish-tinged yellow colorations on cotton. In the form of the free acid, the dyestuff corresponds to the formula

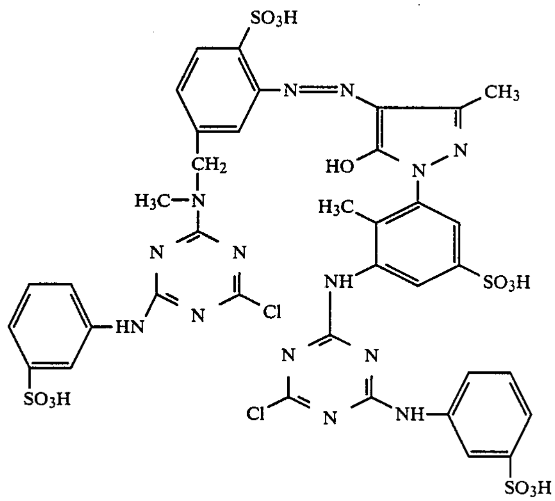

Following the procedure of Example 21, the diazo components mentioned in column 1 of the table which follows, when coupled with the coupling components mentioned in column 2, give similar dyestuffs, which, using one of the methods mentioned in conjunction with Example 1, give, on cotton, wet-fast dyeings having the shades shown in column 3.

| Example | Column 1 | Column 2 | Column 3 |
|---|---|---|---|
| 22 | 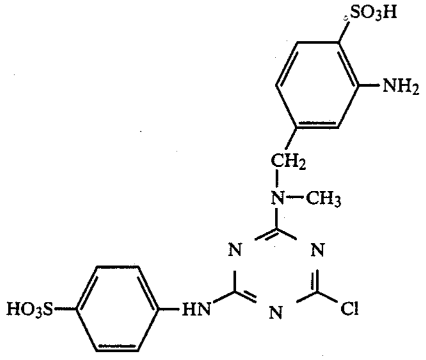 | 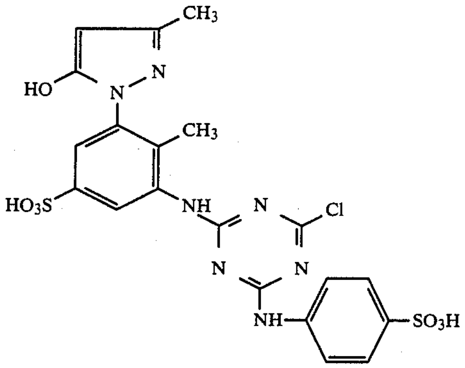 | greenish-tinged yellow |
| 23 | 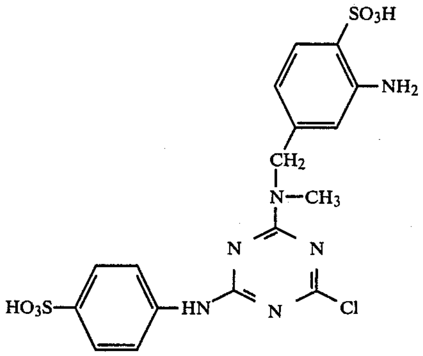 | 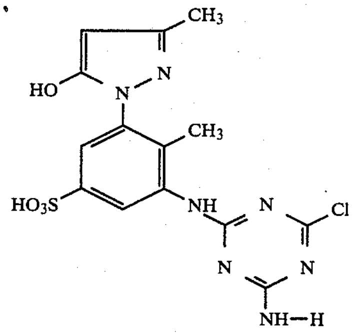 | greenish-tinged yellow |
| 24 | 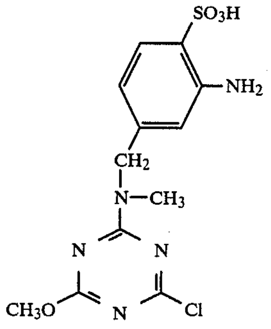 | 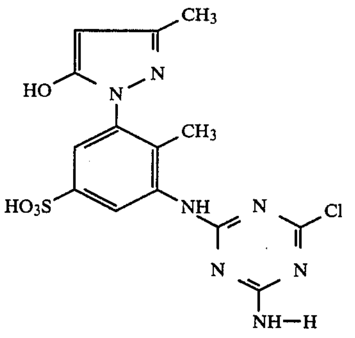 | greenish-tinged yellow |
| 25 | 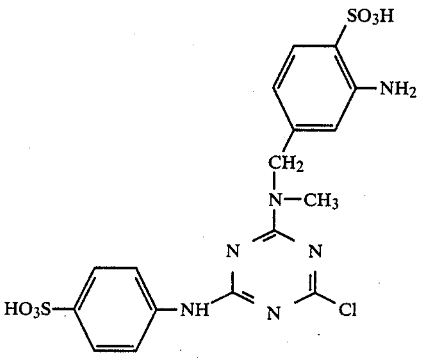 | 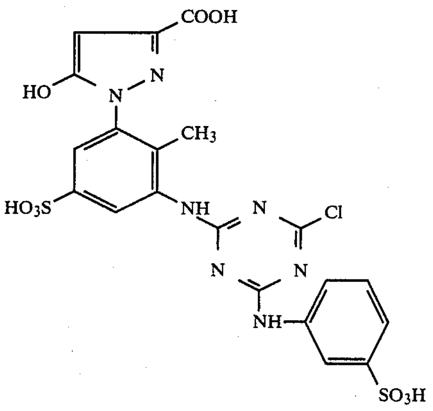 | yellow |

-continued
| Example | Column 1 | Column 2 | Column 3 |
| --- | --- | --- | --- |
| 26 | 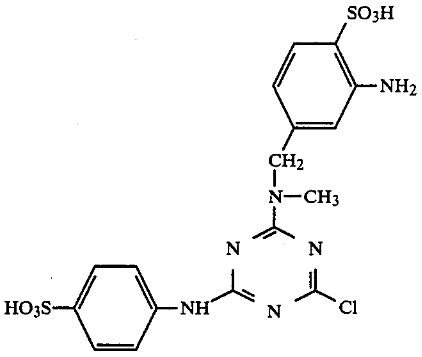 | 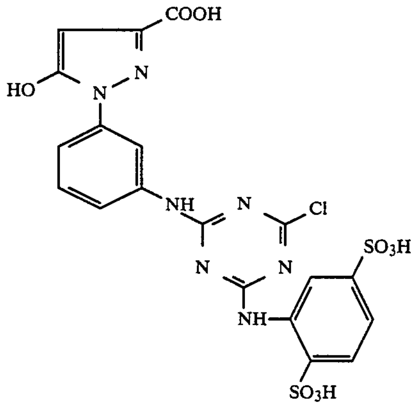 | yellow |
| 27 | 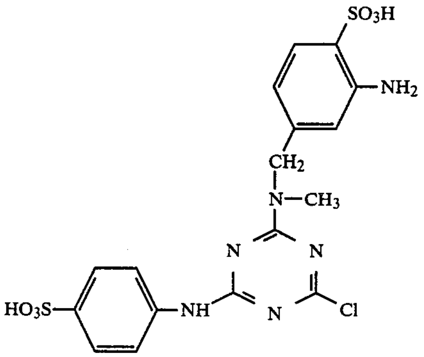 | 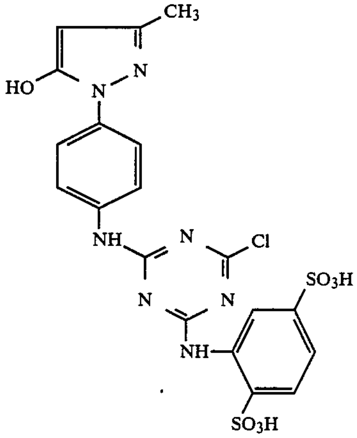 | greenish-tinged yellow |
| 28 | 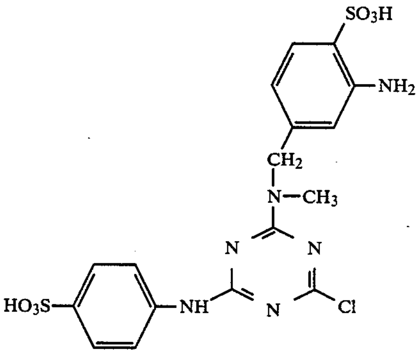 | 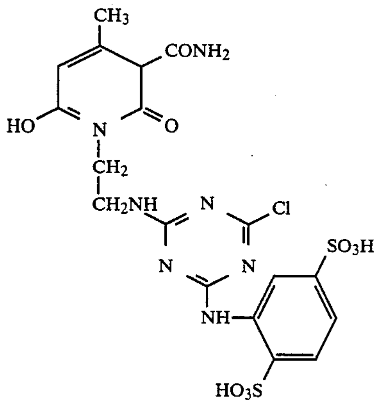 | strongly greenish-tinged yellow |

-continued

| Example | Column 1 | Column 2 | Column 3 |
|---|---|---|---|
| 29 | 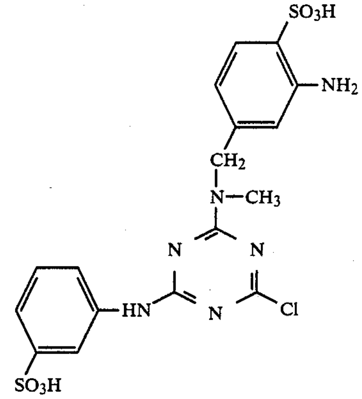 | 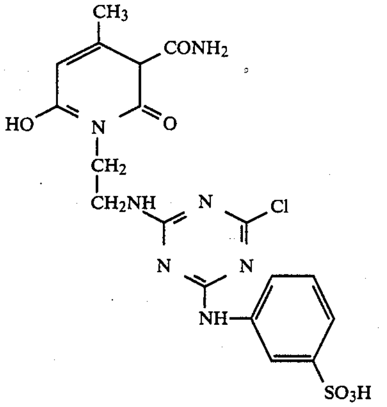 | strongly greenish-tinged yellow |

EXAMPLE 30

A neutral solution of 66.3 g of the azo dyestuff of the formula

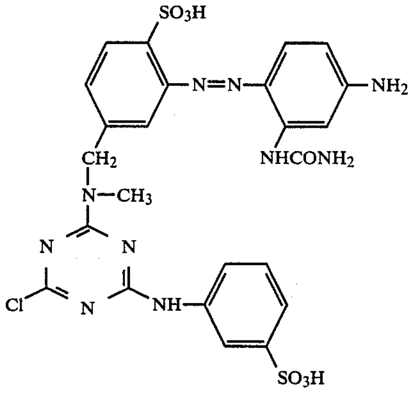

in 0.8 liter of water are acylated with 32.1 g of the primary condensation product of 1 mol of cyanuric chloride and 1 mol of m-sulphanilic acid at 40°-50° C. and pH 6, the hydrochloric acid eliminated being neutralised with 10% strength sodium carbonate solution.

After completion of condensation, the dyestuff is salted out, filtered off, dried at 70° C. and ground. A yellow dyestuff powder is obtained, which easily dissolves in water, giving a yellow colour. Using one of the use methods described, this product gives yellow dyeings and prints, having good wet fastness and light fastness, on cotton.

EXAMPLE 31

A neutral solution of 85.3 g of the diazo dyestuff of the formula

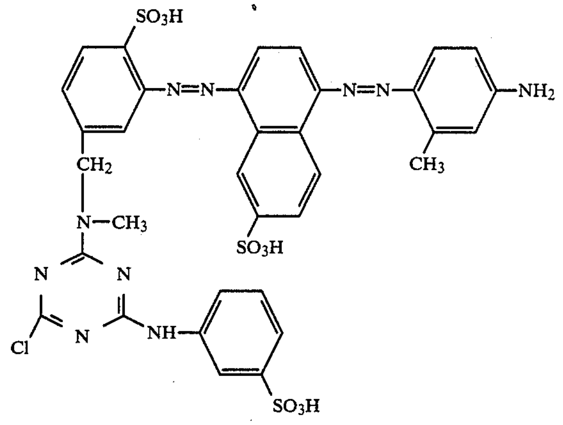

in 1 liter of water are acylated with 32.1 g of the primary condensation product of 1 mol of cyanuric chloride and 1 mol of m-sulphanilic acid at 40°-50° C. and pH 6, the hydrochloric acid eliminated being neutralised with 10% strength sodium carbonate solution. After completion of condensation, the dyestuff is salted out, filtered off, dried at 70° C. and ground. A brown dyestuff powder is obtained, which readily dissolved in water. Using one of the use methods described, this product gives orange-brown dyeings and prints, having good wet fastness and light fastness, on cotton.

EXAMPLE 32

53.7 g of the secondary condensation product of 1 mol of cyanuric chloride, 1 mol of m-sulphanilic acid and 1 mol of 5-aminomethyl-2-amino-naphthalene-1-sulphonic acid are stirred with 1 liter of ice water and 28 ml of concentrated hydrochloric acid, and 70 ml of a 10% strength by volume sodium nitrite solution are added at 0°-2°. After removing the excess nitrile present, by means of amidosulphonic acid, the suspension obtained is added to 46.7 g of the primary condensation product of 1 mol of cyanuric chloride and 1 mol of 1-amino-8-hydroxy-naphthalene-4,6-disulphonic acid. Coupling is then completed at pH 5-6. After completion of coupling, 17.3 g of m-sulphanilic acid are added, the mixture is warmed to 30°-35° and at the same time the hydrochloric acid eliminated is neutralised with 10% strength sodium carbonate solution. The dyestuff obtained after completion of condensation is redissolved and reprecipitated with sodium chloride, filtered off, dried and ground.

In the form of the free acid, the dyestuff corresponds to the formula

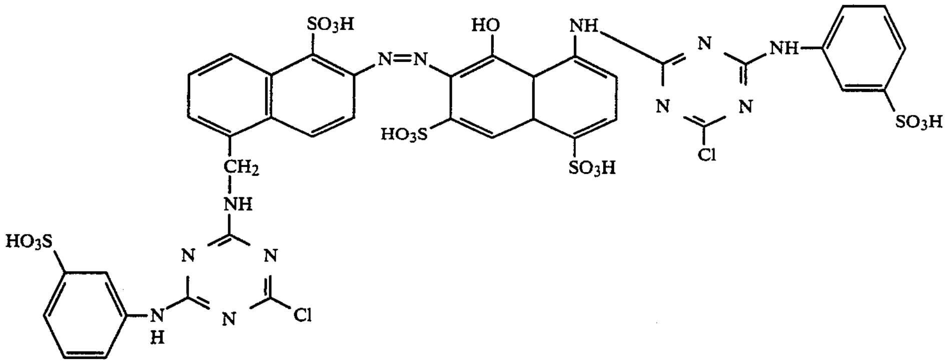

Using one of the application methods mentioned in conjunction with Example 1, this dyestuff gives brilliant bluish-tinged red dyeings and prints on cellulose-containing material. If the instructions of the present example are followed but instead of m-sulphanilic acid an equivalent amount of one of the amines mentioned below is used, valuable dyestuffs are again obtained, which dye cellulose-containing material in bluish-tinged red shades.

The relevant amines are p-sulphanilic acid, o-sulphanilic acid, 1-amino-2-methyl-benzene-5-sulphonic acid, 1-amino-2-methyl-benzene-4-sulphonic acid, 1-amino-2-methoxy-benzene-5-sulphonic acid, 1-amino-2-chloro-benzene-4-sulphonic acid, 1-amino-2-chloro-benzene-5-sulphonic acid, 1-amino-benzene-2,5-disulphonic acid, 1-amino-benzene-3,5-disulphonic acid and 1-amino-2-carboxy-benzene-5-sulphonic acid.

EXAMPLE 33

53.7 g of the secondary condensation product of 1 mol of cyanuric chloride, 1 mol of m-sulphanilic acid and 1 mol of 5-aminomethyl-2-amino-naphthalene-1-sulphonic acid are stirred with 1 liter of ice water and 28 ml of concentrated hydrochloric acid, and 70 ml of a 10% strength by volume sodium nitrite solution are added at 0°-2°. After removing the excess nitrite present by means of aminosulphonic acid, the suspension obtained is added to 46.7 g of the primary condensation product of 1 mol of cyanuric chloride and 1 mol of 1-amino-8-hydroxy-naphthalene-4,6-disulphonic acid. Coupling is then completed at pH 5-6. After completion of coupling, the pH is adjusted to 8.5-9 with 17% strength ammonia solution and the mixture is warmed to 30°-35° until no further change in pH occurs.

The dyestuff obtained after completion of condensation is salted out with sodium chloride, filtered off, dried and ground. In the form of the free acid, it corresponds to the formula

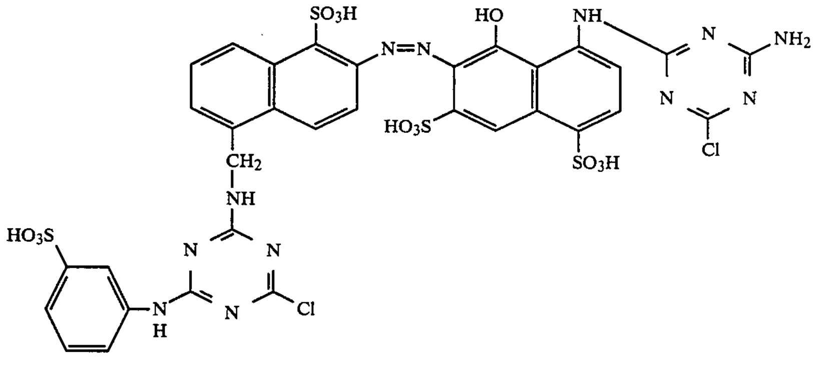

If instead of ammonia one of the amines mentioned below is used, valuable dyestuffs are again obtained, which dye cotton, in accordance with one of the application methods mentioned, in clear bluish-tinged red shades:

The relevant amines are methylamine, ethylamine, isopropylamine, cyclohexylamine, ethanolamine, diethanolamine, morpholine and others.

EXAMPLE 34

51.7 g of the secondary condensation product of 1 mol of cyanuric chloride, 1 mol of m-sulphanilic acid and 1 mol of 1-amino-3-aminomethyl-4-methoxy-benzene-2-sulphonic acid are stirred with 1 liter of ice water and 28 ml of concentrated hydrochloric acid, and 70 ml of a 10% strength by volume sodium nitrite solution are added at 0°-2° C. After removing the excess nitrite present by means of amidosulphonic acid, the suspension obtained is added to 46.7 g of the primary condensation product of 1 mol of cyanuric chloride and 1 mol of 1-amino-8-hydroxy-naphthalene-4,6-disulphonic acid. Coupling is then completed at pH 5-6. After completion of coupling, 17.3 g of m-sulphanilic acid are added, the mixture is warmed to 30°-35° and the hydrochloric acid split off is neutralised with 10% strength sodium carbonate solution. The dyestuff obtained after completion of condensation is salted out with sodium chloride, filtered off, dried and ground.

In the form of the free acid, it corresponds to the formula

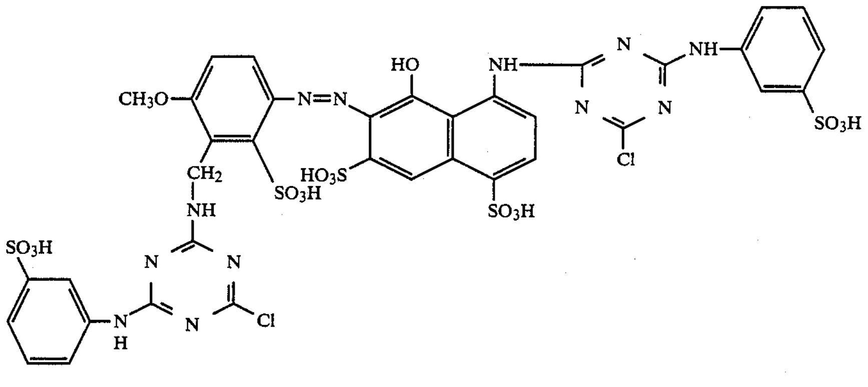

When used in accordance with one of the application methods mentioned in conjunction with Example 1, the dyestuff gives brilliant bluish-tinged red dyeings and prints on cellulose-containing material. If the instructions of the present example are followed but instead of m-sulphanilic acid an equivalent amount of one of the amines mentioned below is used, valuable dyestuffs are again obtained, which dye cellulose-containing material in bluish-tinged red shades. The relevant amines are: p-sulphanilic acid, o-sulphanilic acid, 1-amino-2-methyl-benzene-5-sulphonic acid, 1-amino-3-methyl-benzene-4-sulphonic acid, 1-amino-2-methoxy-benzene-5-sulphonic acid, 1-amino-2-chloro-benzene-4-sulphonic acid, 1-amino-2-chloro-benzene-5-sulphonic acid, 1-amino-benzene-2,5-disulphonic acid, 1-amino-benzene-3,5-disulphonic acid and 1-amino-2-carboxy-benzene-5-sulphonic acid.

EXAMPLE 35

51.7 g of the secondary condensation product of 1 mol of cyanuric chloride, 1 mol of m-sulphanilic acid and 1 mol of 1-amino-3-aminomethyl-4-methoxy-benzene-2-sulphonic acid are stirred with 1 liter of ice water and 28 ml of concentrated hydrochloric acid and 70 ml of a 10% strength by volume sodium nitrite solution are added at 0°-2°. After removing the excess nitrite present by means of amidosulphonic acid, the suspension obtained is added to 46.7 g of the primary condensation product of 1 mol of cyanuric chloride and 1 mol of 1-amino-8-hydroxy-naphthalene-4,6-disulphonic acid. Coupling is then completed at pH 5-6. After completion of coupling, the pH is brought to 8.5-9 with 12% strength ammonia solution and the mixture is warmed to 30°-35° C. until no further change in pH occurs.

The dyestuff obtained after completion of condensation is salted out with sodium chloride, filtered off, dried and ground. In the form of the free acid, it corresponds to the formula

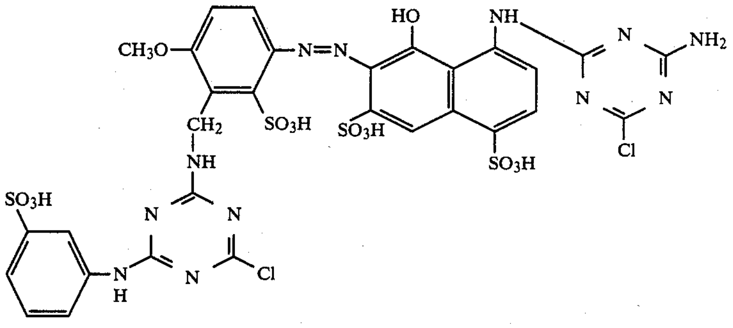

If instead of ammonia one of the amines mentioned below is used, valuable dyestuffs are again obtained, which dye cotton, in accordance with one of the application methods mentioned, in clear bluish-tinged red shades. The relevant amines are: methylamine, ethylamine, isopropylamine, cyclohexylamine, ethanolamine, diethanolamine, morpholine and others.

EXAMPLE 36

53.7 g of the secondary condensation product of 1 mol of cyanuric chloride, 1 mol of m-sulphanilic acid and 1 mol of 3-amino-4-sulpho-N-methylbenzylamine are stirred with 1 liter of ice water and 28 ml of concentrated hydrochloric acid, and 70 ml of a 10% strength by volume sodium nitrite solution are added at 0°-2° C. After removing the excess nitrite present by means of amidosulphonic acid, the suspension obtained is added to 46.7 g of the primary condensation product of 1 mol of cyanuric chloride and 1 mol of 1-amino-8-hydroxy-naphthalene-4,6-disulphonic acid. Coupling is then completed at pH 4-5. After completion of coupling, 17.3 g of m-sulphanilic acid are added, the mixture is warmed to 30°-35°, and the hydrochloric acid split off is neutralised with 10% strength sodium carbonate solution. The dyestuff obtained after completion of condensation is salted out with sodium chloride, filtered off, dried and ground. It is identical with the product prepared according to Example 1.

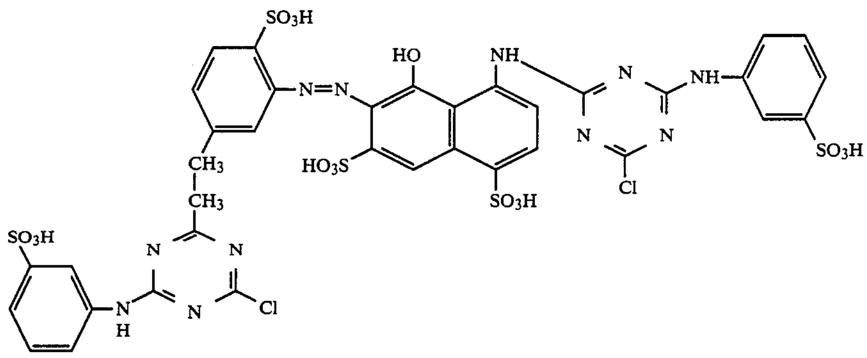

Using one of the application methods mentioned in conjunction with Example 1, the dyestuff gives brilliant bluish-tinged red dyeings and prints on cellulose-containing material. If the instructions of the present example are followed, but instead of m-sulphanilic acid an equivalent amount of one of the amines mentioned below is used, valuable dyestuffs are again obtained, which dye cellulose-containing material is bluish-tinged red shades. The relevant amines are: p-sulphanilic acid, o-sulphanilic acid, 1-amino-2-methyl-benzene-5-sulphonic acid, 1-amino-3-methyl-benzene-4-sulphonic acid, 1-amino-2-methoxy-benzene-5-sulphonic acid, 1-amino-2-chloro-benzene-4-sulphonic acid, 1-amino-2-chloro-benzene-5-sulphonic acid, 1-amino-benzene-2,5-disulphonic acid, 1-amino-benzene-3,5-disulphonic acid and 1-amino-2-carboxy-benzene-5-sulphonic acid.

EXAMPLE 37

46.6 g of the monoazo dyestuff 2-sulpho-5-N-methylamino-methyl-benzene<1 azo 2>1-hydroxy-3-sulpho-6-aminonaphthalene are stirred with 500 ml of water and 65 g of the primary condensation product of 1 mol of cyanuric chloride and 1 mol of m-sulphanilic acid are added. The condensation is initially carried out at pH 8.5 and 15°-30°, and thereafter the mixture is warmed to 40°-45° and the pH is kept at 7 with 10% strength sodium carbonate solution. After completion of condensation, the dyestuff is salted out with sodium chloride, filtered off, dried and ground. The product obtained is identical with the dyestuff prepared according to Example 15.

Following the procedure of Example 37, the monoazo dyestuffs mentioned in column 1 of the table below, when acylated with the acylating components mentioned in column 2, also give valuable dyestuffs, which, using one of the processes mentioned, give wet-fast dyeings, in the shades shown in column 3, on cotton.

| Example | Column 1 | Column 2 | Column 3 |
|---|---|---|---|
| 38 | 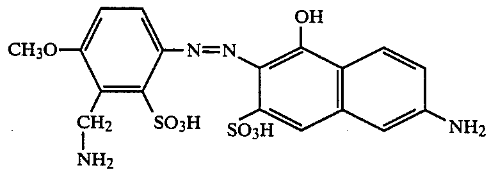 | 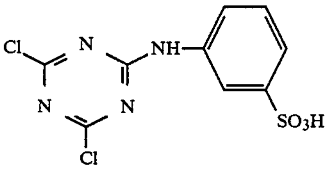 | scarlet |
| 39 | 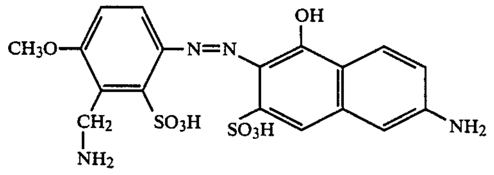 | 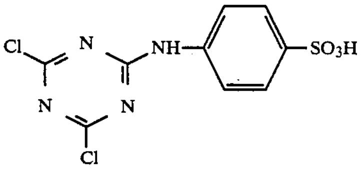 | scarlet |
| 40 | 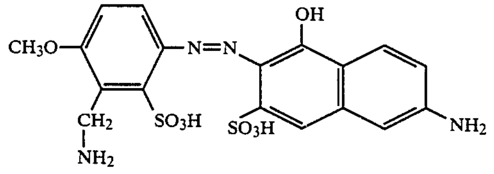 | 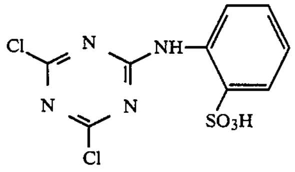 | scarlet |

-continued
| Example | Column 1 | Column 2 | Column 3 |
|---|---|---|---|
| 41 | 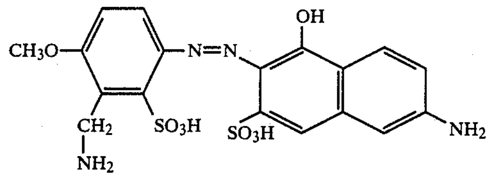 | 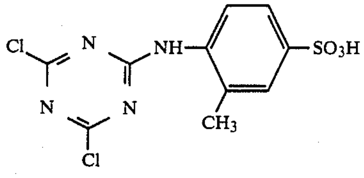 | scarlet |
| 42 | 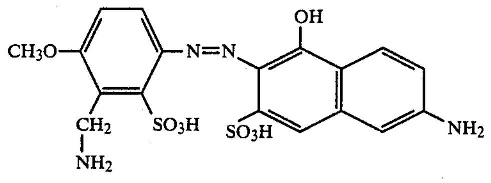 | 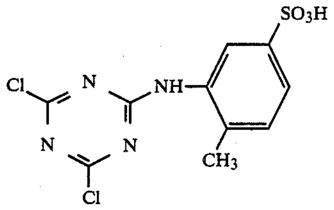 | scarlet |
| 43 | 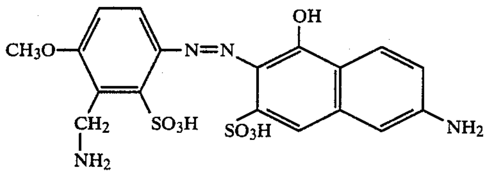 | 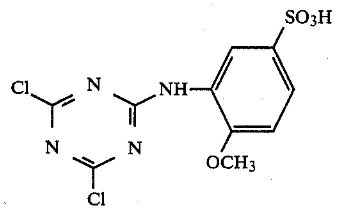 | scarlet |
| 44 | 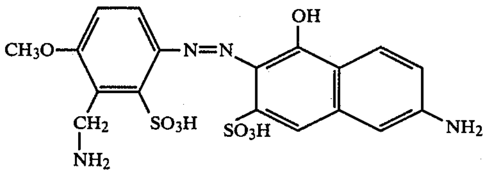 | 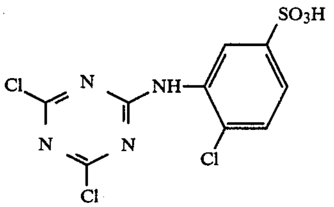 | scarlet |
| 45 | 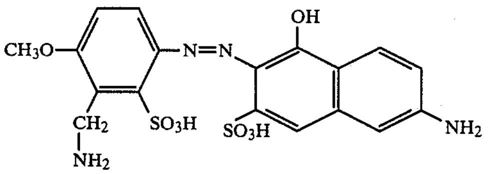 | 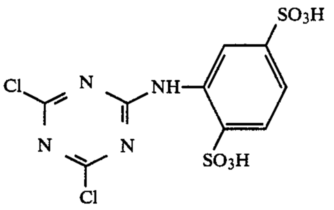 | scarlet |
| 46 | 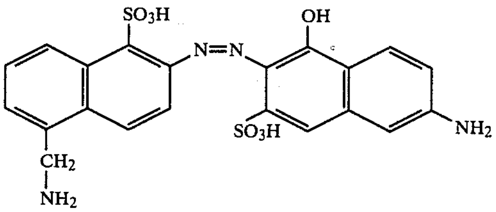 | 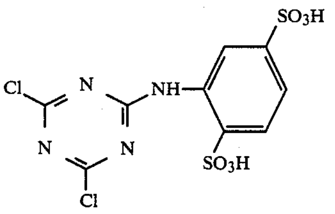 | reddish-tinged orange |
| 47 | 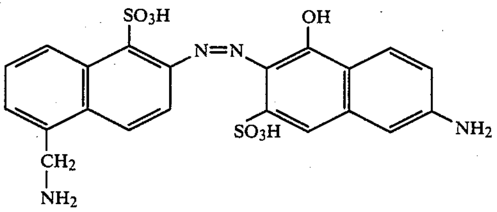 | 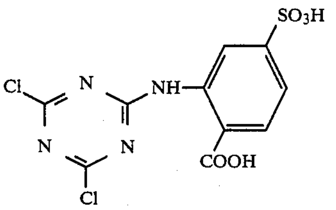 | reddish-tinged orange |

-continued
| Example | Column 1 | Column 2 | Column 3 |
|---|---|---|---|
| 48 | 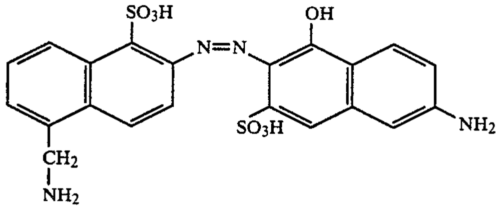 | 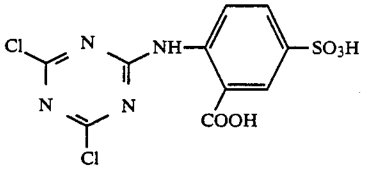 | reddish-tinged orange |
| 49 | 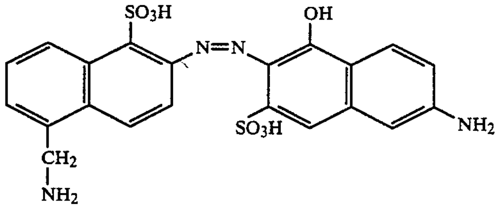 | 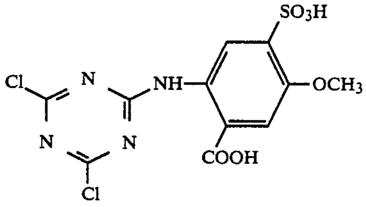 | reddish-tinged orange |
| 50 | 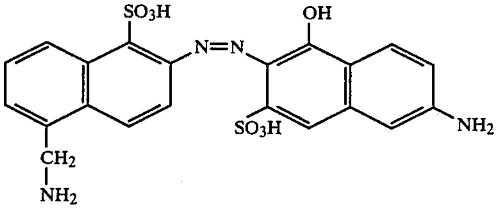 | 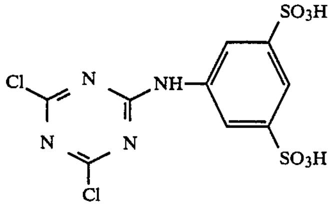 | reddish-tinged orange |
| 51 | 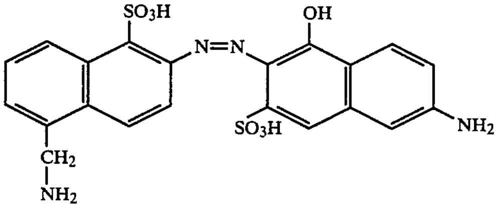 | 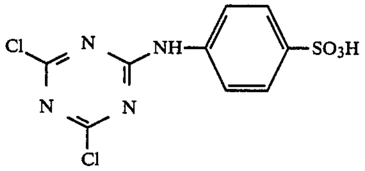 | reddish-tinged orange |
| 52 | 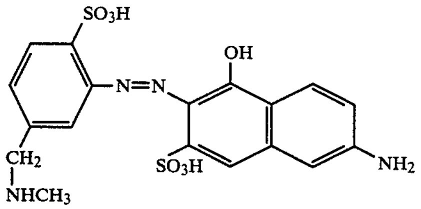 | 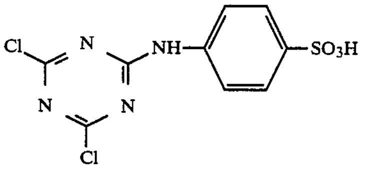 | yellowish-tinged orange |
| 53 | 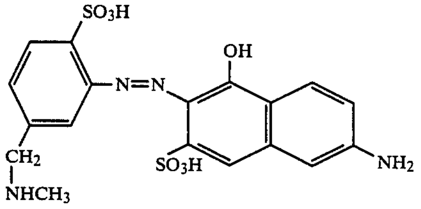 | 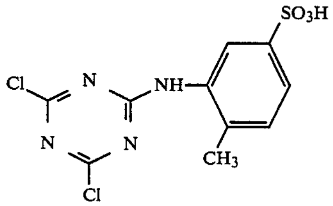 | yellowish-tinged orange |
| 54 | 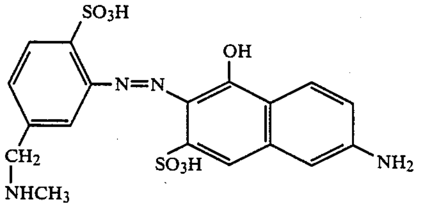 | 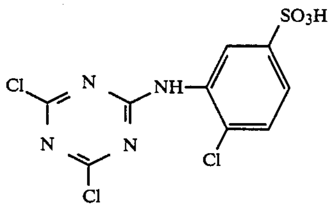 | yellowish-tinged orange |

-continued

| Example | Column 1 | Column 2 | Column 3 |
| --- | --- | --- | --- |
| 55 | 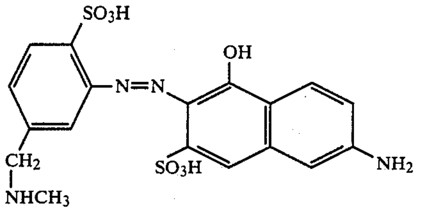 | 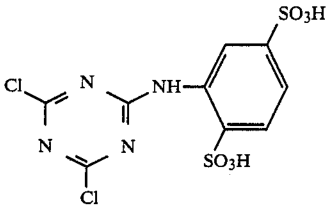 | yellowish-tinged orange |
| 56 | 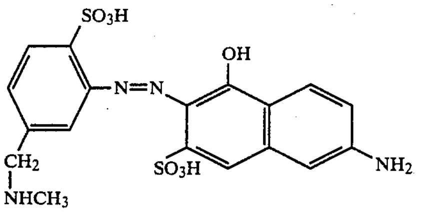 | 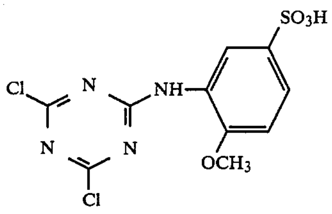 | yellowish-tinged orange |

EXAMPLE 57

53.7 g of the secondary condensation product of 1 mol of cyanuric chloride, 1 mol of m-sulphanilic acid and . . . 5-aminomethyl-2-amino-naphthalene-1-sulphonic acid are stirred with 1 liter of ice water and 28 ml of concentrated hydrochloric acid and diazotised with 70 ml of 10% strength sodium nitrite solution. After removing the excess nitrite present by means of amidosulphonic acid, the diazo suspension obtained is introduced into a mixture of 56.8 g of the secondary condensation product of 1 mol of cyanuric chloride, 1 mol of 1-(2'-methyl-5'-sulpho-3'-aminophenyl)-3-methyl-pyrazol-5-one and 1 mol of m-sulphanilic acid, and 28 g of sodium bicarbonate in 400 ml of ice water. After completion of coupling, the dyestuff is salted out with sodium chloride, filtered off, dried at 70°–80° C. and ground. The dyestuff is readily soluble in water, giving a yellow colour, and when used in accordance with one of the methods recommended in conjunction with Example 1 gives greenish-tinged yellow dyeings on cotton. In the form of the free acid, the dyestuff corresponds to the formula

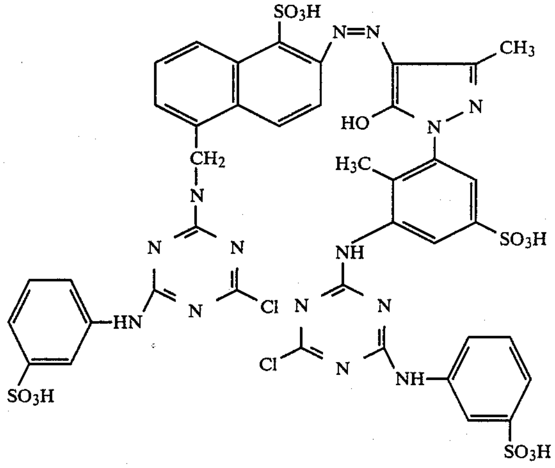

Following the procedure of Example 57, the diazo components mentioned in column 1 of the table below, when coupled with the coupling components mentioned in column 2, yield similar dyestuffs which, using one of the processes mentioned in conjunction with Example 1, give wet-fast dyeings, in the shades shown in column 3, on cotton.

| Example | Column 1 | Column 2 | Column 3 |
|---|---|---|---|
| 58 | 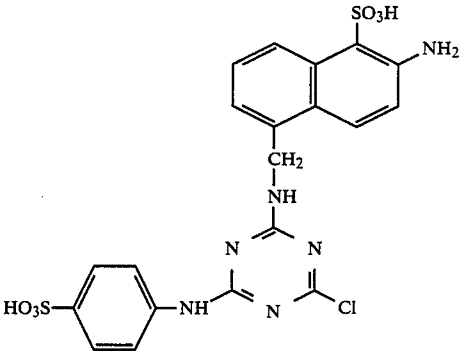 | 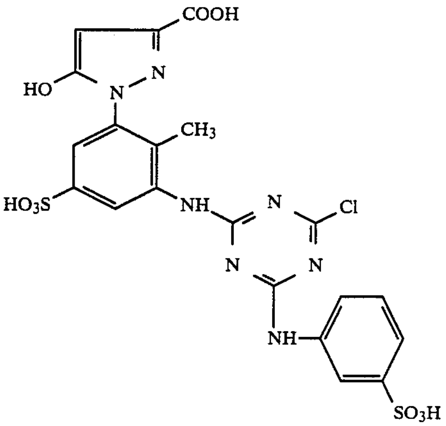 | yellow |
| 59 | | 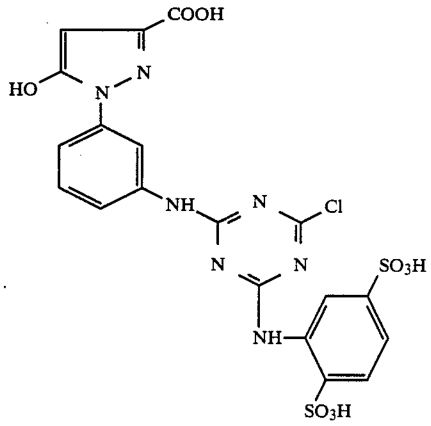 | yellow |
| 60 | | 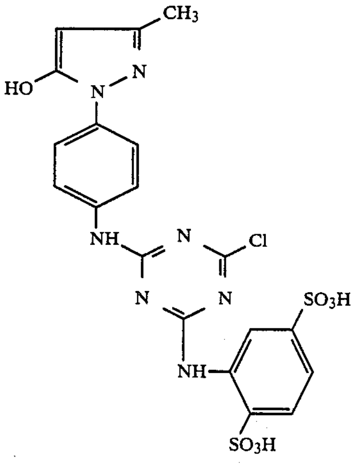 | yellow |

-continued
| Example | Column 1 | Column 2 | Column 3 |
| --- | --- | --- | --- |
| 61 | 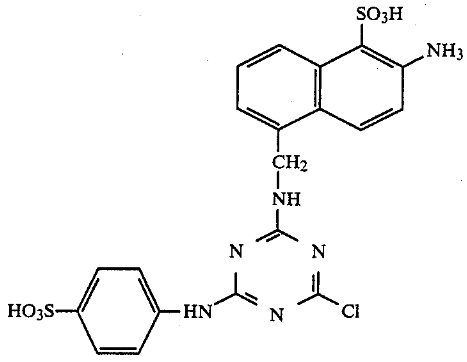 | 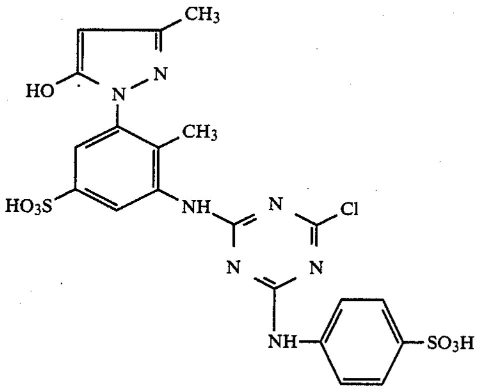 | yellow |
| 62 | 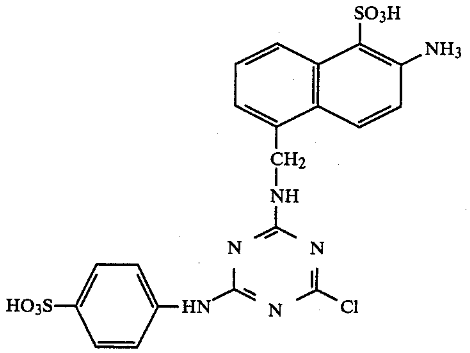 | 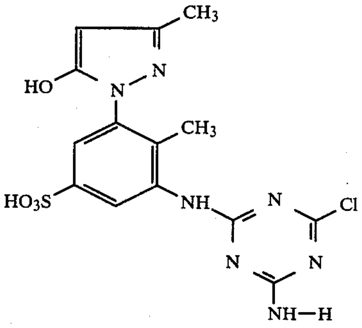 | yellow |
| 63 | 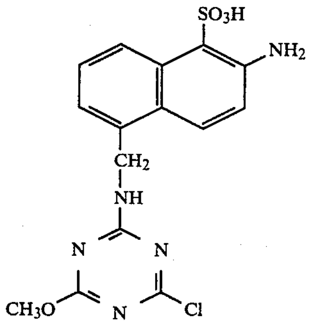 | 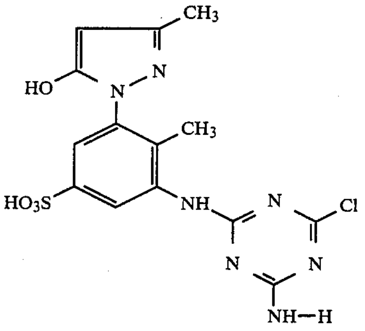 | yellow |
| 64 | 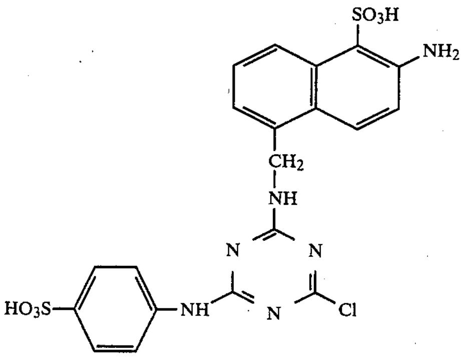 | 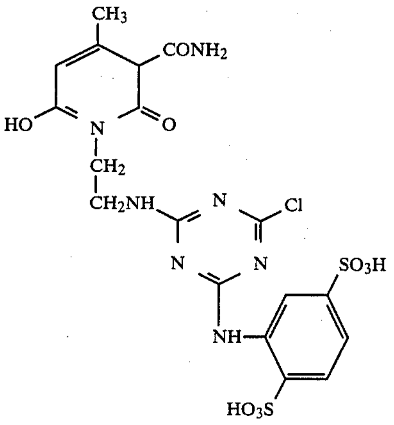 | strongly greenish-tinged yellow |

-continued

| Example | Column 1 | Column 2 | Column 3 |
| --- | --- | --- | --- |
| 65 | 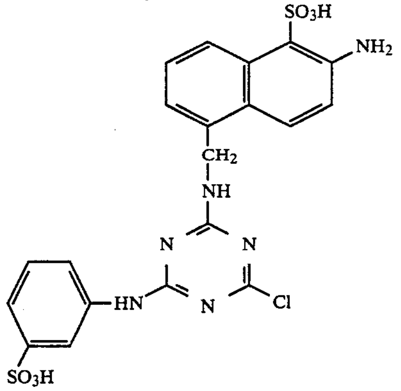 | 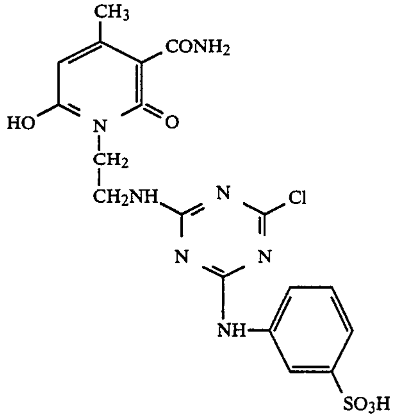 | strongly greenish-tinged yellow |

EXAMPLE 66

51.7 g of the secondary condensation product of 1 mol of cyanuric chloride, 1 mol of m-sulphanilic acid and . . . 1-amino-3-aminomethyl-4-methoxy-benzene-2-sulphonic acid are stirred with 1 liter of ice water and 28 ml of concentrated hydrochloric acid and diazotised with 70 ml of 10% strength sodium nitrite solution.

After removing the excess nitrite present by means of amidosulphonic acid, the diazo suspension obtained is introduced into a mixture of 56.8 g of the secondary condensation product of 1 mol of cyanuric chloride, 1 mol of 1-(2'-methyl-5'-sulpho-3'-aminophenyl)-3-methyl-pyrazol-5-one and 1 mol of m-sulphanilic acid, and 28 g of sodium bicarbonate in 400 ml of ice water. After completion of coupling, the dyestuff is salted out with sodium chloride, filtered off, dried at 70°-80° C. and ground. The dyestuff is readily soluble in water, giving a yellow colour, and when used in accordance with one of the methods recommended in conjunction with Example 1, gives greenish-tinged yellow dyeings on cotton. In the form of the free acid, the dyestuff corresponds to the formula

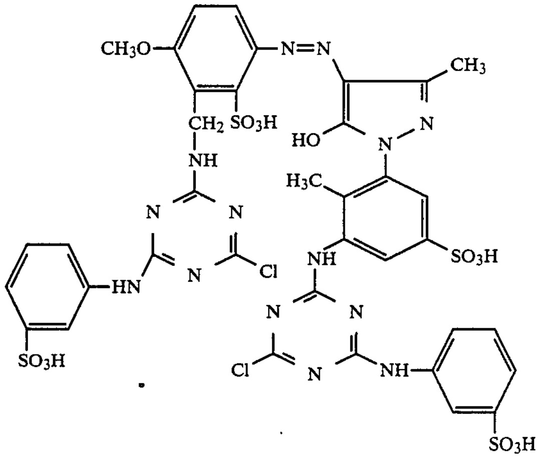

Following the procedure of Example 66, the diazo components mentioned in column 1 of the table below, when coupled with the coupling components shown in column 2, yield similar dyestuffs which, using one of the methods mentioned in conjunction with Example 1, give wet-fast dyeings, in the shades shown in column 3, on cotton.

| Example | Column 1 | Column 2 | Column 3 |
| --- | --- | --- | --- |
| 67 | 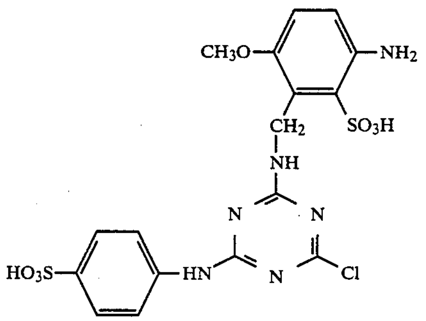 | 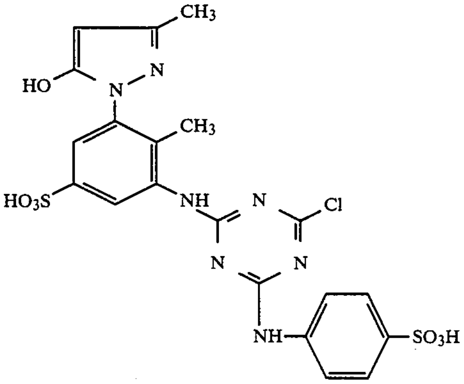 | reddish-tinged yellow |

-continued
| Example | Column 1 | Column 2 | Column 3 |
|---|---|---|---|
| 68 | 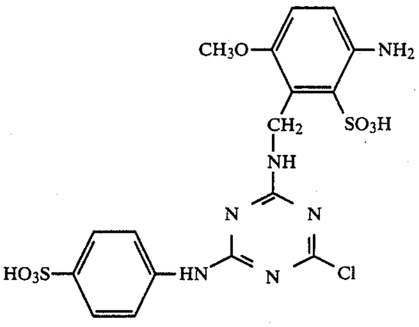 | 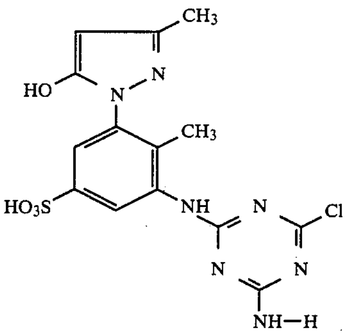 | reddish-tinged yellow |
| 69 | 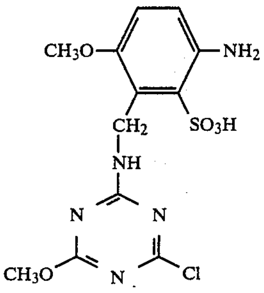 | 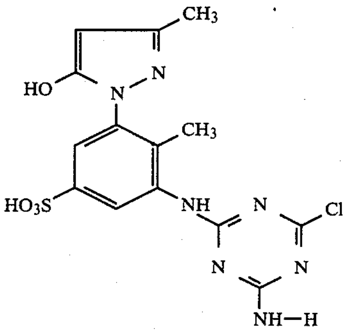 | reddish-tinged yellow |
| 70 | 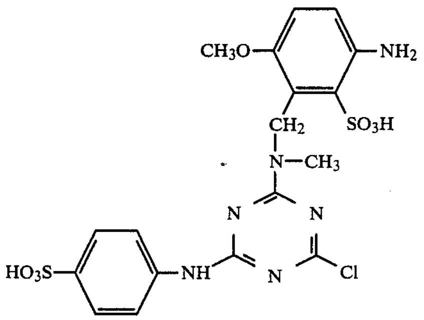 | 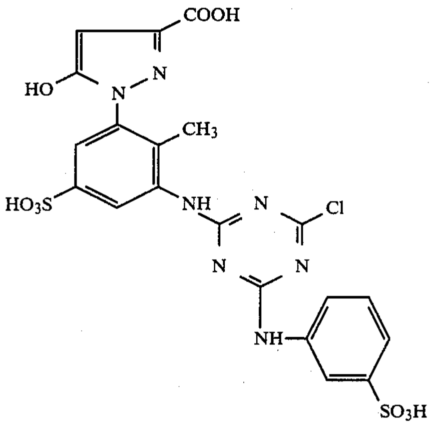 | reddish-tinged yellow |
| 71 | 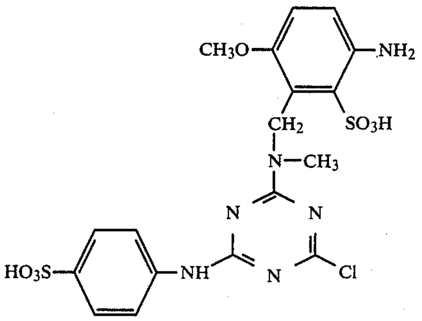 | 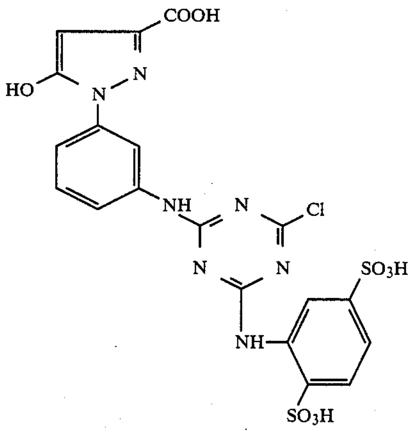 | reddish-tinged yellow |

-continued
| Example | Column 1 | Column 2 | Column 3 |
|---|---|---|---|
| 72 | 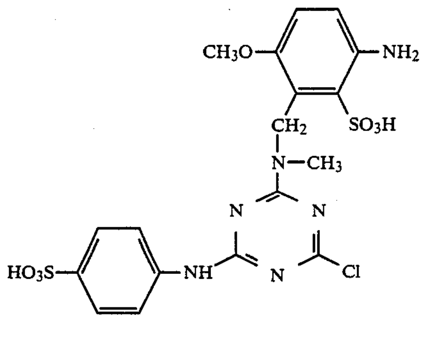 | 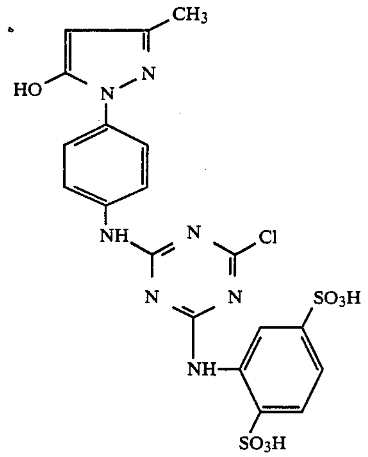 | reddish-tinged yellow |
| 73 | 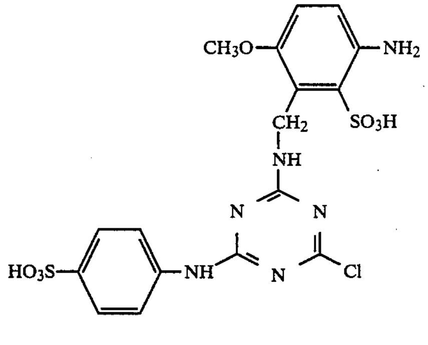 | 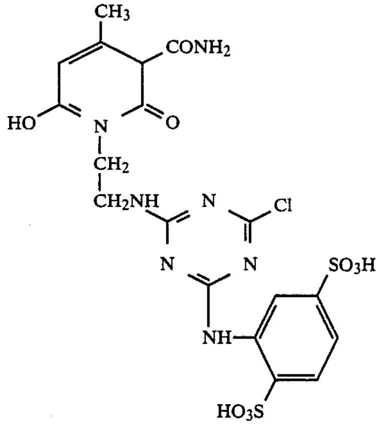 | greenish-tinged yellow |
| 74 | 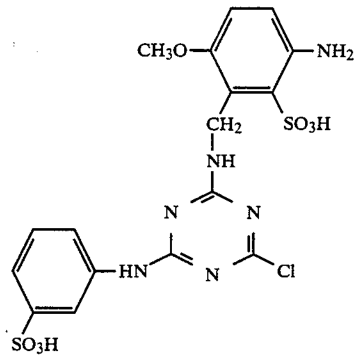 | 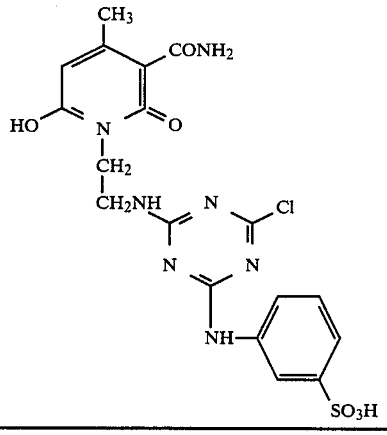 | greenish-tinged yellow |
EXAMPLE 75
80 g of the dyestuffs of the formula

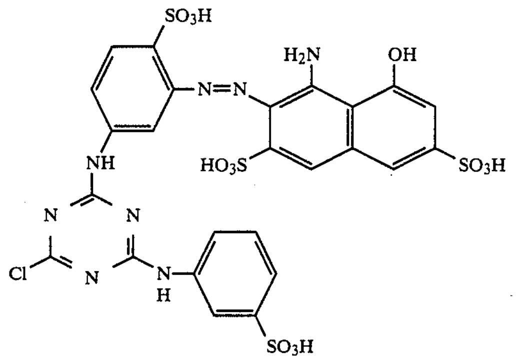

are dissolved in 500 ml of water and 28 g of sodium bicarbonate are added. To this mixture is added dropwise a suspension of a diazo compound which is obtained by diazotising 50 g of the amine of the formula

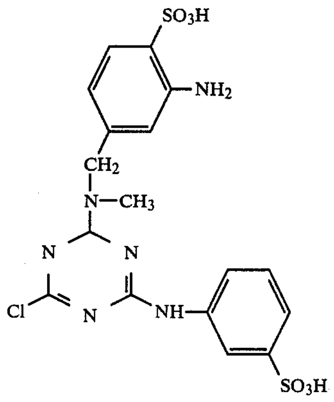

After completion of coupling, the dyestuff is salted out, filtered off, dried and ground. A dark blue powder is obtained, which readily dissolves in water, giving a blue colour. Using one of the application methods mentioned in conjunction with Example 1, the dyestuff gives blue-black dyeings and prints, of high wet-fastness, on cotton.

EXAMPLE 76

83.1 g of the dyestuff of the formula

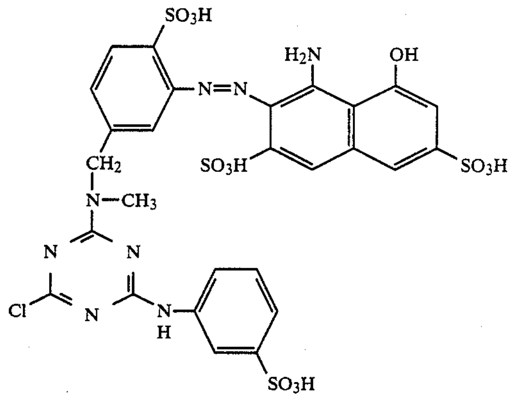

are dissolved in 500 ml of water and 28 g of sodium bicarbonate are added. To this mixture is added a diazo compound which is obtained from 47.3 g of the amine of the formula

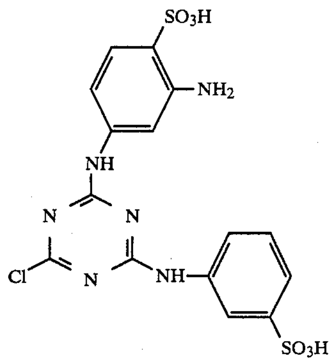

The dyestuff is salted out with sodium chloride, filtered off, dried and ground. A dark blue powder is obtained, which readily dissolves in water, giving a blue colour. Using one of the application methods mentioned in conjunction with Example 1, the dyestuff gives blue-black dyeings and prints, of high wet-fastness, on cotton.

EXAMPLE 77

74.5 g of the dyestuff 2-sulpho-5-N-methylaminomethylbenzene<1 azo 2>1-amino-8-hydroxy-3,6-disulphonaphthalene<7 azo 1>2-sulpho-5-amino-benzene are stirred with 500 ml of water and 65 g of the primary condensation product of 1 mol of cyanuric chloride and 1 mol of m-sulphanilic acid are added. The condensation is initially carried out at pH 8.5 and 25°-30°, and the mixture is then warmed to 40°-45°, whilst keeping the pH at 7 by means of 20% strength sodium carbonate solution. After completion of condensation, the dyestuff is salted out, filtered off, dried and ground. It corresponds to the formula

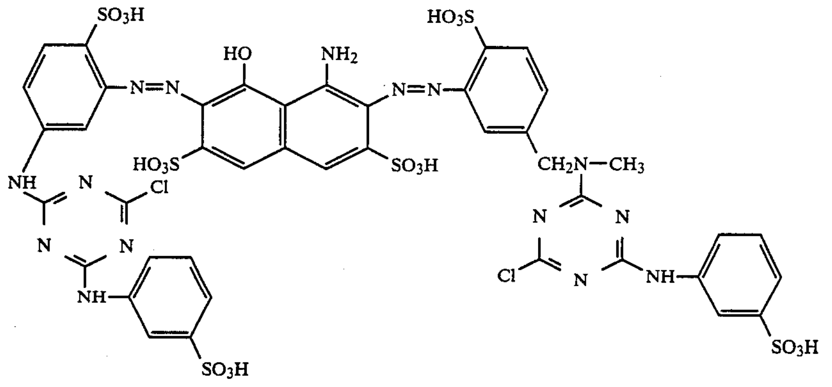

and is identical with the product prepared according to Example 76.

Following the procedure of Example 77, the disazo dyestuffs mentioned in column 1 of the table below, when acylated with the acylating components mentioned in column 2, also give valuable dyestuffs, which, using one of the application methods mentioned, give wet-fast dyeings, in the shades shown in column 3, on cotton.

| Example | Column 1 | Column 2 | Column 3 |
|---|---|---|---|
| 78 | 2-sulpho-5-N—methylamino-methyl-benzene<1 azo 2>1-amino-8-hydroxy-3,6-disulpho-naphthalene<7 azo 1>2-sulpho-5-amino-benzene | 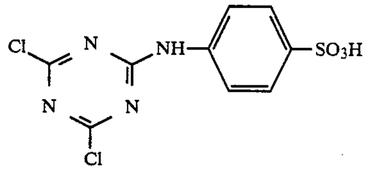 | blue-black |
| 79 | 2-sulpho-5-N—methylamino-methyl-benzene<1 azo 2>1-amino-8-hydroxy-3,6-disulpho-naphthalene<7 azo 1>2-sulpho-5-amino-benzene | 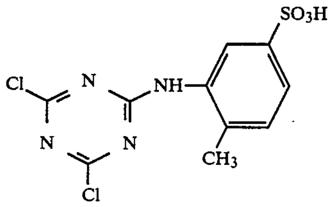 | blue-black |
| 80 | 2-sulpho-5-N—methylamino-methyl-benzene<1 azo 2>1-amino-8-hydroxy-3,6-disulpho-naphthalene<7 azo 1>2-sulpho-5-amino-benzene | 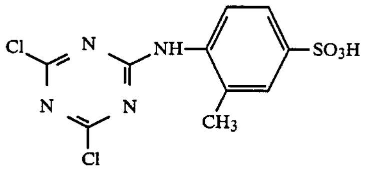 | blue-black |
| 81 | 2-sulpho-5-N—methylamino-methyl-benzene<1 azo 2>1-amino-8-hydroxy-3,6-disulpho-naphthalene<7 azo 1>2-sulpho-5-amino-benzene | 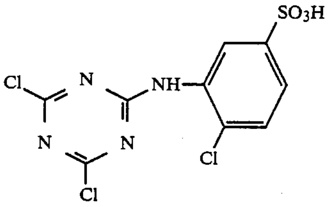 | blue-black |
| 82 | 2-sulpho-5-N—methylamino-methyl-benzene<1 azo 2>1-amino-8-hydroxy-3,6-disulpho-naphthalene<7 azo 1>2-sulpho-5-amino-benzene | 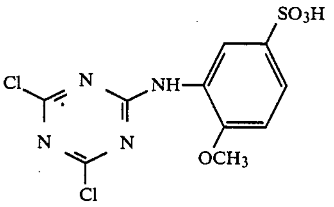 | blue-black |

-continued

| Example | Column 1 | Column 2 | Column 3 |
|---|---|---|---|
| 83 | 2-sulpho-5-N—methylamino-methyl-benzene<1 azo 2>1-amino-8-hydroxy-3,6-disulpho-naphthalene<7 azo 1>2-sulpho-4-amino-benzene | 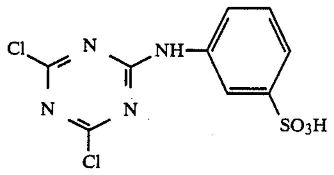 | greenish-tinged blue |
| 84 | 2-sulpho-5-N—methylamino-methyl-benzene<1 azo 2>1-amino-8-hydroxy-3,6-disulpho-naphthalene<7 azo 1>2-sulpho-4-amino-benzene | 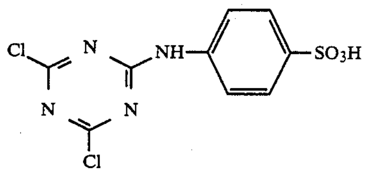 | greenish-tinged blue |
| 85 | 2-sulpho-5-N—methylamino-methyl-benzene<1 azo 2>1-amino-8-hydroxy-3,6-disulpho-naphthalene<7 azo 1>2-sulpho-4-amino-benzene | 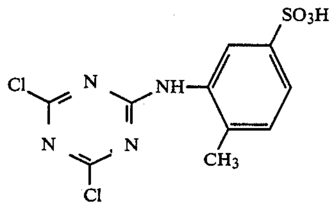 | greenish-tinged blue |
| 86 | 2-sulpho-5-N—methylamino-methyl-benzene<1 azo 2>1-amino-8-hydroxy-3,6-disulpho-naphthalene<7 azo 1>2-sulpho-4-amino-benzene | 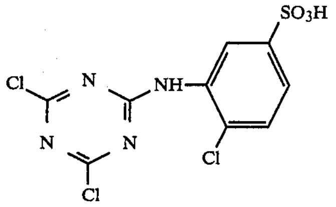 | greenish-tinged blue |
| 87 | 2-sulpho-5-N—methylamino-methyl-benzene<1 azo 2>1-amino-8-hydroxy-3,6-disulpho-naphthalene<7 azo 1>2-sulpho-4-amino-benzene | 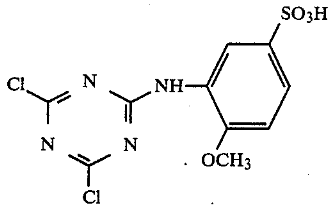 | greenish-tinged blue |
| 88 | 1-sulpho-5-aminomethyl-naphthalene<2 azo 2>1-amino-8-hydroxy-3,6-disulpho-naphthalene<7 azo 1>2-sulpho-5-amino-benzene | 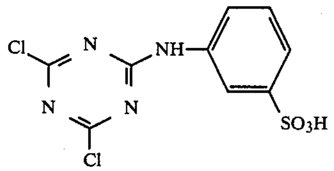 | greenish-tinged black |
| 89 | 1-sulpho-5-aminomethyl-naphthalene<2 azo 2>1-amino-8-hydroxy-3,6-disulpho-naphthalene<7 azo 1>2-sulpho-5-amino-benzene | 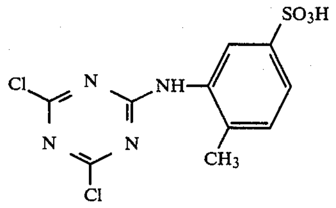 | greenish-tinged black |

-continued

| Example | Column 1 | Column 2 | Column 3 |
|---|---|---|---|
| 90 | 1-sulpho-5-aminomethyl-naphthalene<2 azo 2>1-amino-8-hydroxy-3,6-disulpho-naphthalene<7 azo 1>2-sulpho-5-amino-benzene | 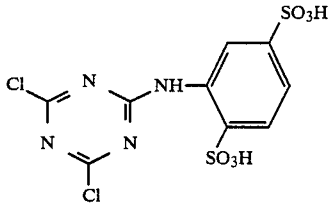 | greenish-tinged black |
| 91 | 1-sulpho-5-aminomethyl-naphthalene<2 azo 2>1-amino-8-hydroxy-3,6-disulpho-naphthalene<7 azo 1>2-sulpho-5-amino-benzene | 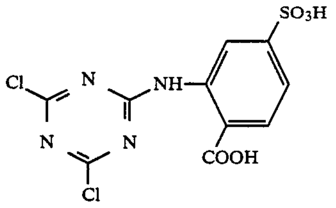 | greenish-tinged black |
| 92 | 1-sulpho-5-aminomethyl-naphthalene<2 azo 2>1-amino-8-hydroxy-3,6-disulpho-naphthalene<7 azo 1>2-sulpho-5-amino-benzene | 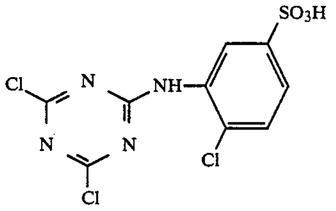 | greenish-tinged black |

EXAMPLE 93

57 g of the disazo dyestuff 2-sulpho-5-N-methylaminomethyl<1 azo 1>7-sulpho-naphthalene<4 azo 1>2-methyl-4-amino-benzene are stirred with 500 ml of water and 65 g of the primary condensation product of 1 mol of cyanuric chloride and 1 mol of m-sulphanilic acid are added. The condensation is first carried out at pH 8.5 and 25°-30° C. and the mixture is then warmed to 40°-45° whilst maintaining a pH of 7 by means of 20% strength sodium carbonate solution. After completion of condensation, the dyestuff is salted out with sodium chloride, filtered off, dried and ground. It is identical with the product prepared according to Example 31.

Following the procedure of Example 93, the diazo dyestuffs mentioned in column 1 of the table below, when acylated with the acylating components mentioned in column 2, also yield valuable dyestuffs which, using one of the application methods mentioned, give wet-fast dyeings, in the shades shown in column 3, on cotton.

| Example | Column 1 | Column 2 | Column 3 |
|---|---|---|---|
| 94 | 2-sulpho-5-N—methylaminomethyl-benzene<1 azo 1>7-sulpho-naphthalene<4 azo 1>2-methyl-4-amino-benzene | 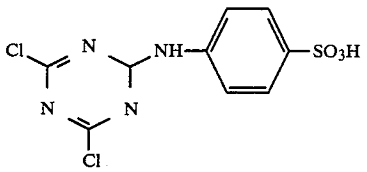 | orange-brown |
| 95 | 2-sulpho-5-N—methylaminomethyl-benzene<1 azo 1>7-sulpho-naphthalene<4 azo 1>2-methyl-4-amino-benzene | 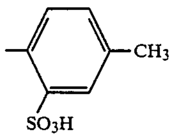 | " |
| 96 | 2-sulpho-5-N—methylaminomethyl-benzene<1 azo 1>7-sulpho-naphthalene<4 azo 1>2-methyl-4-amino-benzene | 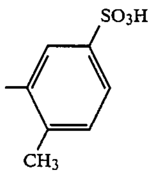 | " |

-continued

| Example | Column 1 | Column 2 | Column 3 |
|---|---|---|---|
| 97 | 2-sulpho-3-aminomethyl-4-methoxy-benzene<1 azo 1>7-sulpho-naphthalene<4 azo 1>2-methyl-4-amino-benzene | 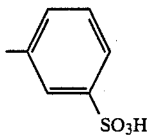 | " |
| 98 | 2-sulpho-3-aminomethyl-4-methoxy-benzene<1 azo 1>7-sulpho-naphthalene<4 azo 1>2-methyl-4-amino-benzene | 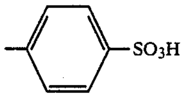 | " |
| 99 | 2-sulpho-3-aminomethyl-4-methoxy-benzene<1 azo 1>7-sulpho-naphthalene<4 azo 1>2-methyl-4-amino-benzene | 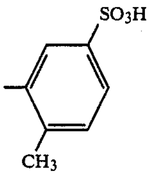 | " |

EXAMPLE 100

37.8 g of the monoazo dyestuff 2-sulpho-5-N-methylaminomethylbenzene<1 azo 1>2-ureido-4-amino-benzene are stirred with 500 ml of water and 65 g of the primary condensation product of 1 mol of cyanuric chloride and 1 mol of m-sulphanilic acid are added. The condensation is first carried out at pH 8.5 and 25°-30°, after which the mixture is warmed to 40°-45° and the pH is kept at 7 by means of 20% strength sodium carbonate solution. After completion of condensation, the dyestuff is salted out with sodium chloride, filtered off, dried and ground. The product obtained is identical with the dyestuff prepared according to Example 30.

Following the procedure of Example 100, the monoazo dyestuffs mentioned in column 1 of the table below, when acylated with the acylating components mentioned in column 2, also yield valuable dyestuffs, which, using one of the application methods mentioned, give wet-fast dyeings, in the shades shown in column 3, on cotton.

| Example | Column 1 | Column 2 | Column 3 |
|---|---|---|---|
| 101 | 2-sulpho-5-N—methylaminomethyl-benzene<1 azo 1>2-ureido-4-amino-benzene | 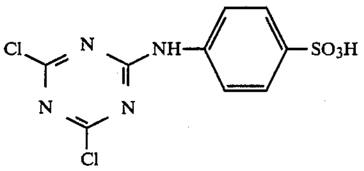 | yellow |
| 102 | 2-sulpho-3-aminomethyl-4-methoxy-benzene<1 azo 1>2-ureido-4-amino-benzene | 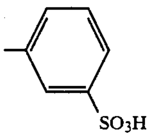 | " |
| 103 | 2-sulpho-3-aminomethyl-4-methoxy-benzene<1 azo 1>2-ureido-4-amino-benzene | 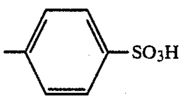 | " |
| 104 | 2-sulpho-3-aminomethyl-4-methoxy-benzene<1 azo 1>2-ureido-4-amino-benzene | 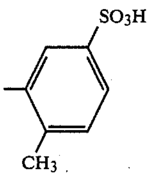 | " |
| 105 | 2-sulpho-5-N—methylaminomethyl-benzene<1 azo 1>2-acetylamino-4-amino-benzene | 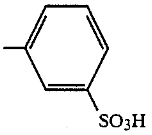 | " |

-continued

| Example | Column 1 | Column 2 | Column 3 |
|---|---|---|---|
| 106 | 2-sulpho-5-N—methylaminomethyl-benzene<1 azo 1>2-acetylamino-4-amino-benzene | 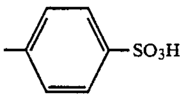 | " |
| 107 | 2-sulpho-5-N—methylaminomethyl-benzene<1 azo 1>2-acetylamino-4-amino-benzene | 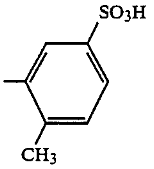 | " |
| 108 | 2-sulpho-3-aminomethyl-4-methoxy-benzene<1 azo 1> 7-sulpho-4-amino-naphthalene | 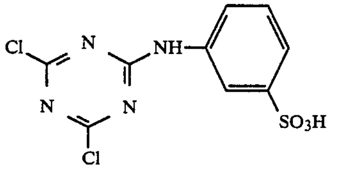 | reddish-tinged yellow |
| 109 | 2-sulpho-3-aminomethyl-4-methoxy-benzene<1 azo 1> 7-sulpho-4-amino-naphthalene | 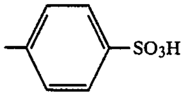 | " |
| 110 | 2-sulpho-3-aminomethyl-4-methoxy-benzene<1 azo 1> 7-sulpho-4-amino-naphthalene | 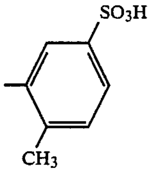 | " |
| 111 | 2-sulpho-5-N—methylaminomethyl-benzene<1 azo 1>5-sulpho-4-amino-naphthalene | 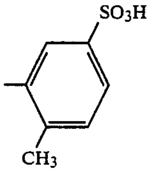 | " |
| 112 | 2-sulpho-5-N—methylaminomethyl-benzene<1 azo 1>5-sulpho-4-amino-naphthalene | 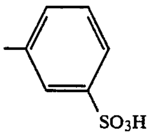 | " |
| 113 | 2-sulpho-5-N—methylaminomethyl-benzene<1 azo 1>5-sulpho-4-amino-naphthalene | 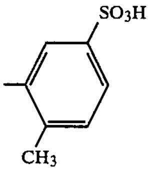 | " |

EXAMPLE 114

66.2 g of the copper complex dyestuff of the formula

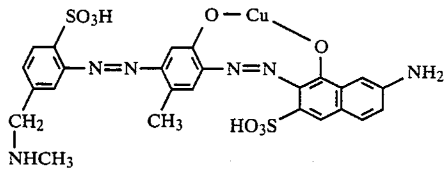

are stirred with 1 liter of water and 65 g of the primary condensation product of 1 mol of cyanuric chloride and 1 mol of m-sulphanilic acid are added. The condensation is first carried out at pH 8.5 and 25°-30°, and thereafter the mixture is warmed to 40°-45° C. and a pH of 7 is maintained by dropwise addition of a 10% strength sodium carbonate solution. After completion of condensation, the dyestuff is salted out with sodium chloride, filtered off, dried and ground. A dark powder is obtained, which readily dissolves in water, giving a blue colour. Using one of the application methods mentioned in conjunction with Example 1, the dyestuff gives a navy blue shade, of good wet-fastness and light fastness, on cotton.

If, using the instructions of the present example, the Cu complexes mentioned in column 1 are reacted with the reactive components mentioned in column 2, valuable dyestuffs are again obtained, which dye cotton in the colour shades mentioned in column 3.

and account is taken of the fact that the condensation of the difluorotriazines is advantageously carried out at lower temperatures than the condensation of the dichlorotriazines, valuable dyestuffs again result.

EXAMPLE 120

38.8 g of the condensation product of 1 mol of 2,4-dichloro-6-isopropoxy-triazine and 1 mol of 3-amino-4-sulpho-N-methyl-benzylamine are stirred with 1 liter of ice water and 28 ml of concentrated hydrochloric acid and the mixture is diazotised at 0°-2° C. with 70 ml of a 10% strength by volume sodium nitrite solution. After removing the excess nitrite present by means of amidosulphonic acid, the diazo suspension obtained is introduced into a mixture of 50.4 g of the secondary condensation product of 1 mol of cyanuric chloride, 1 mol of 1-amino-8-hydroxynaphthalene-4,6-disulphonic acid and 1 mol of m-sulphanilic acid and 28 g of sodium bicarbonate in 500 ml of water. After the coupling reac-

| Example | Column 1 | Column 2 | Column 3 |
|---|---|---|---|
| 115 | 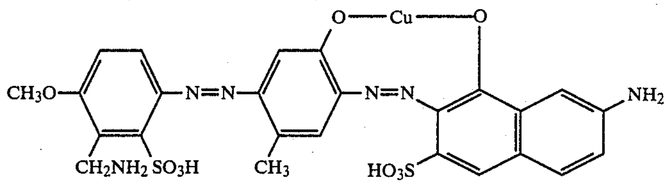 | 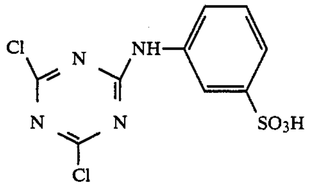 | navy blue |
| 116 | 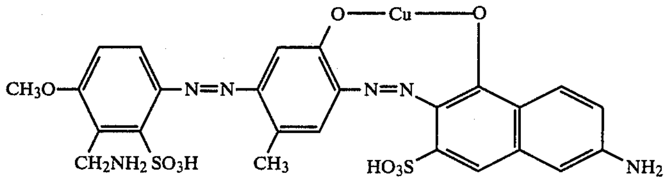 | 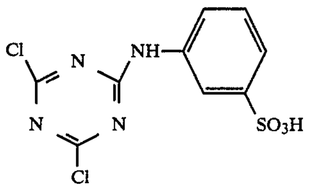 | navy blue |
| 117 | 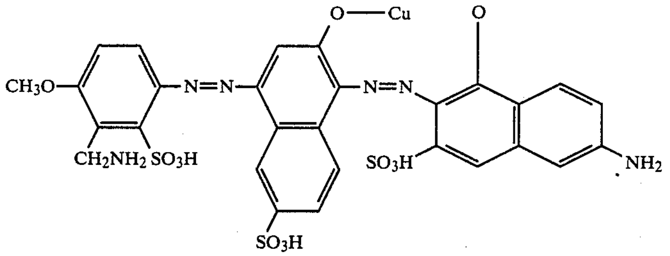 | 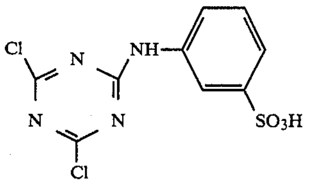 | greenish-tinged blue |
| 118 | 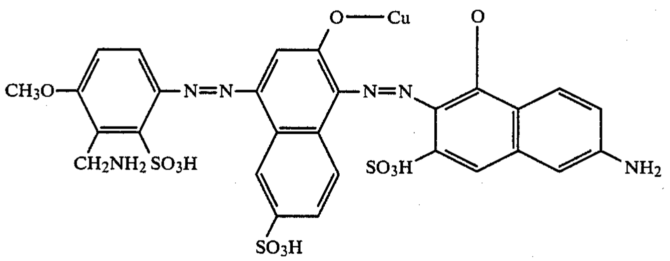 | 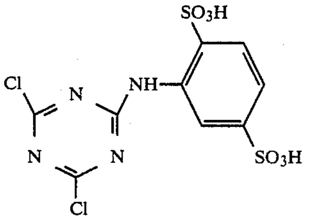 | greenish-tinged blue |

EXAMPLE 119

If the instructions of Examples 1-118 are followed, but instead of the monochlorotriazines or dichlorotriazines used in the said examples the corresponding monofluorotriazines or difluorotriazines are employed, tion has ended, the separating-out of the dyestuff is completed by adding potassium chloride. After filtration, drying at 70° C. in a circulating air drying cabinet, and grinding, a red powder is obtained, which readily dissolves in water, giving a yellowish-tinged red colour.

In the form of the free acid, the dyestuff corresponds to the formula

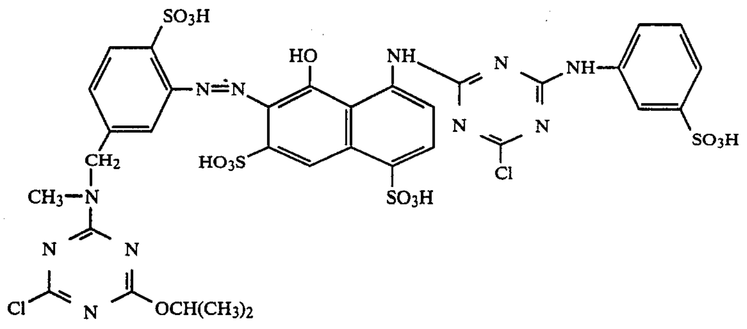

If the instructions of Example 120 are followed, but the amines shown in column 1 are diazotised and combined with the coupling components shown in column 2, valuable dyestuffs are again obtained, which dye cotton, using one of the application methods mentioned, in the colour shades shown in column 3.

| Example | Column 1 | Column 2 | Column 3 |
|---|---|---|---|
| 121 | 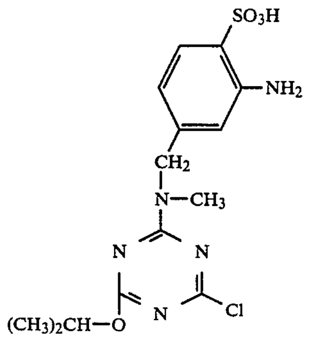 | 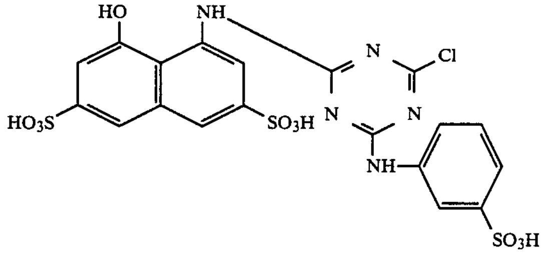 | bluish-tinged red |
| 122 | 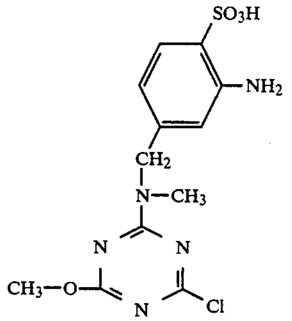 | 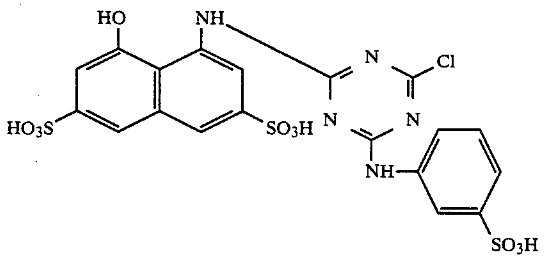 | bluish-tinged red |
| 123 | 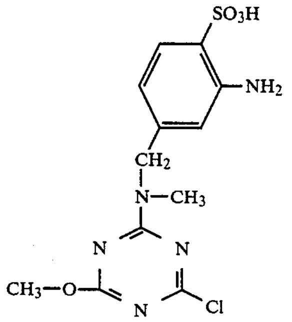 | 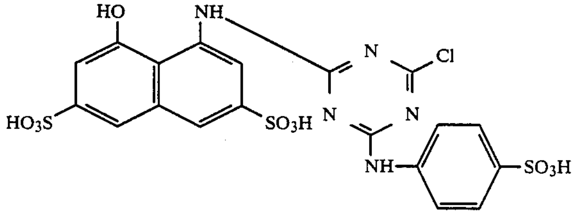 | bluish-tinged red |

-continued
| Example | Column 1 | Column 2 | Column 3 |
|---|---|---|---|
| 124 | 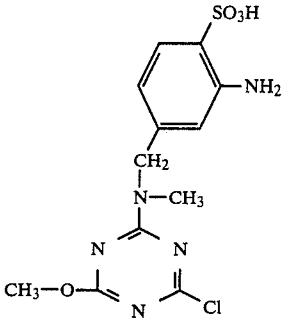 | 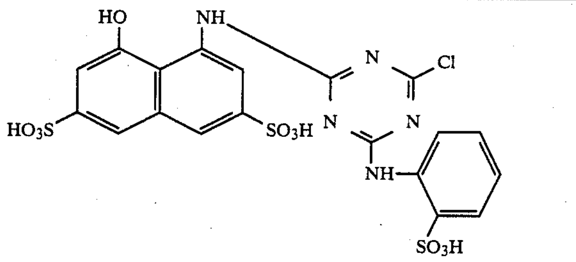 | bluish-tinged red |
| 125 | 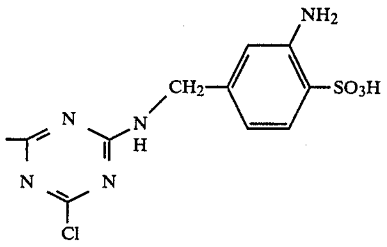 | 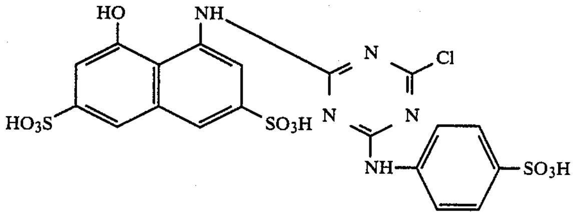 | bluish-tinged red |
| 126 | 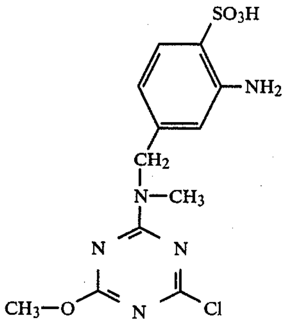 | 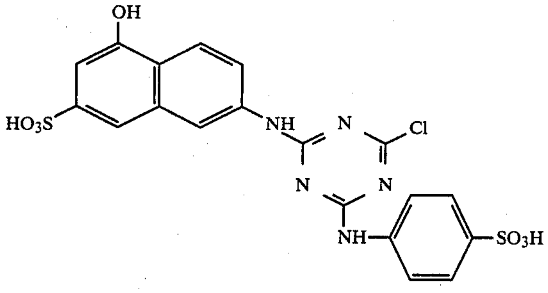 | |
| 127 | 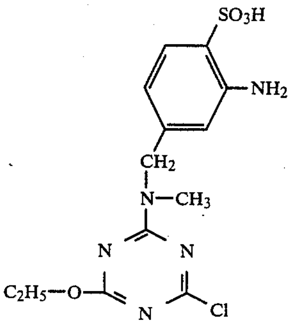 | 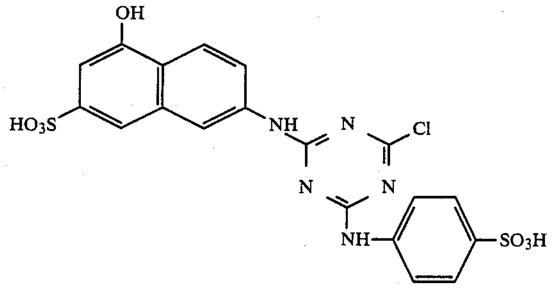 | |
| 128 | 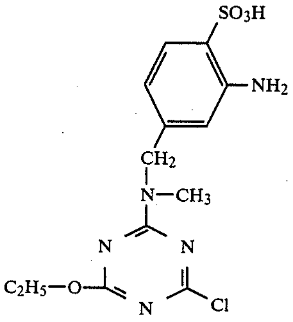 | 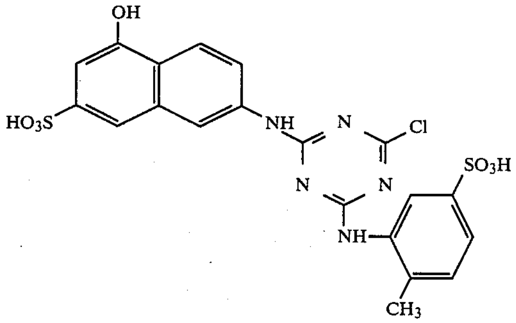 | |

-continued
| Example | Column 1 | Column 2 | Column 3 |
|---|---|---|---|
| 129 | 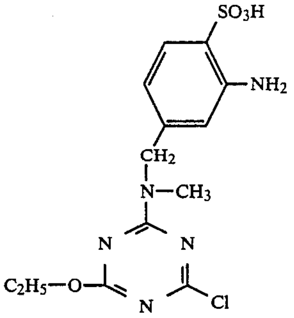 | 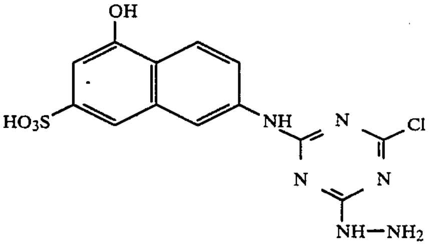 | |
| 129a | 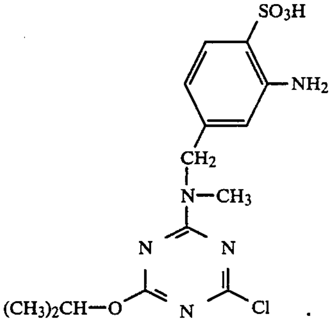 | 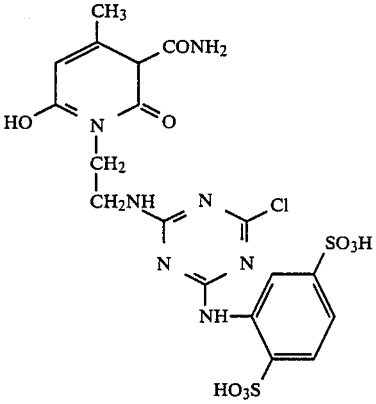 | strongly greenish-tinged yellow |
| 129b | 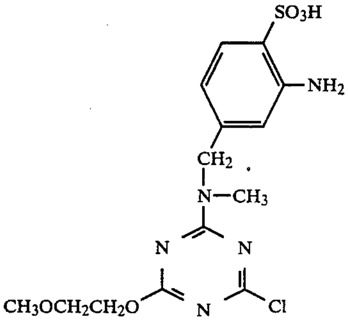 | 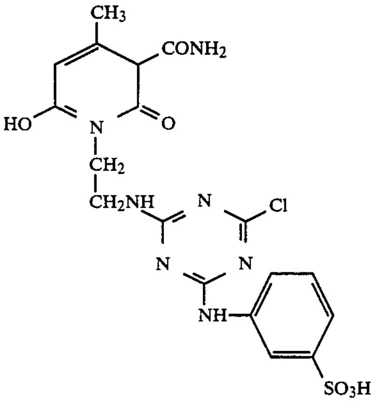 | strongly greenish-tinged yellow |
| 130 | 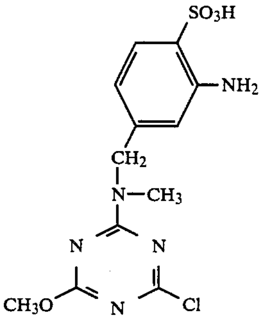 | 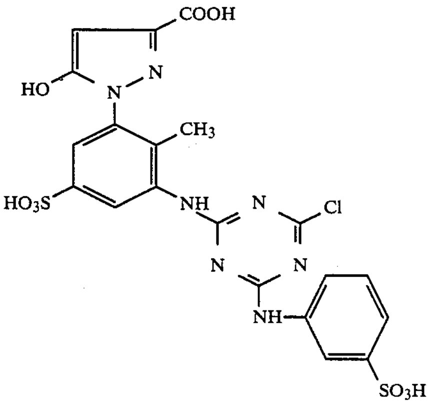 | yellow |

-continued
| Example | Column 1 | Column 2 | Column 3 |
|---|---|---|---|
| 131 | 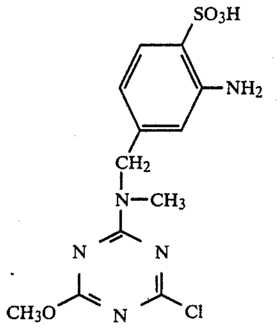 | 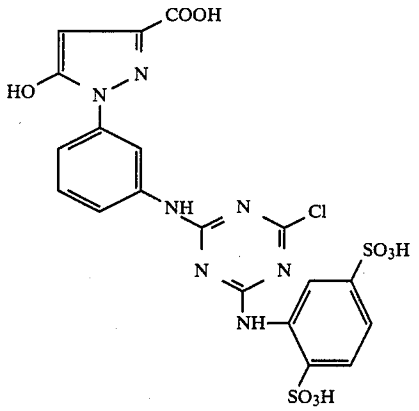 | yellow |
| 132 | 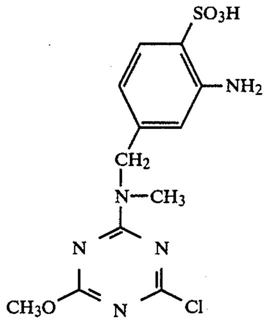 | 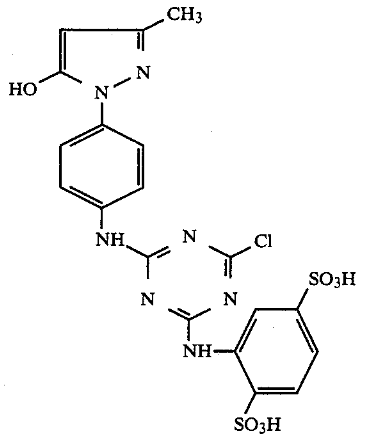 | greenish-tinged yellow |
| 133 | 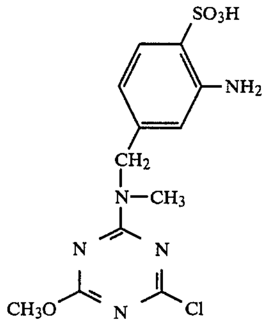 | 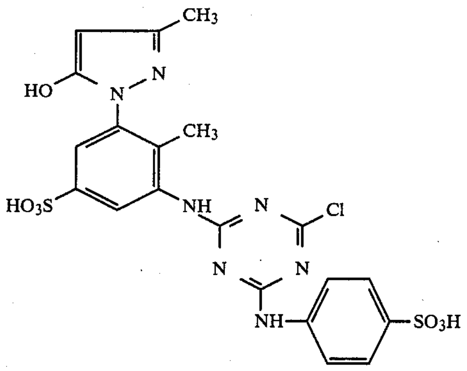 | greenish-tinged yellow |
| 134 | 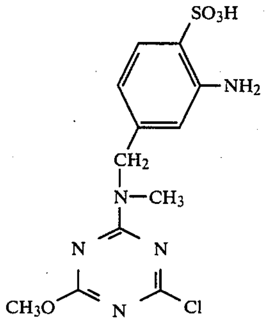 | 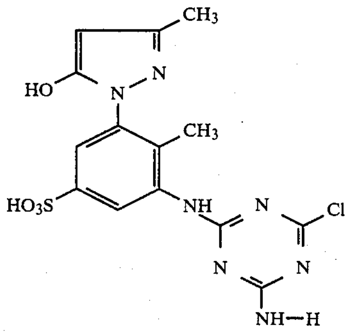 | greenish-tinged yellow |

-continued
| Example | Column 1 | Column 2 | Column 3 |
|---|---|---|---|
| 135 | 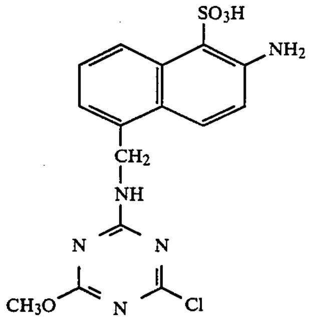 | 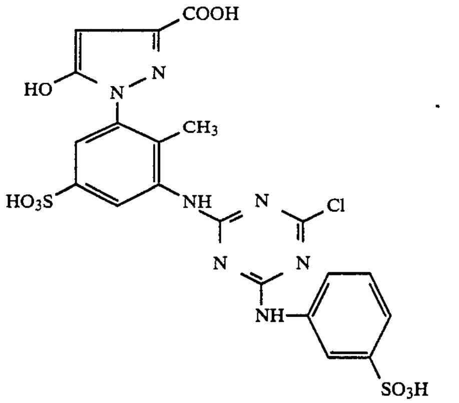 | yellow |
| 136 | 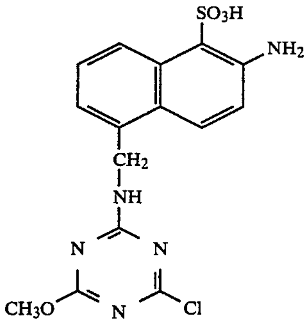 | 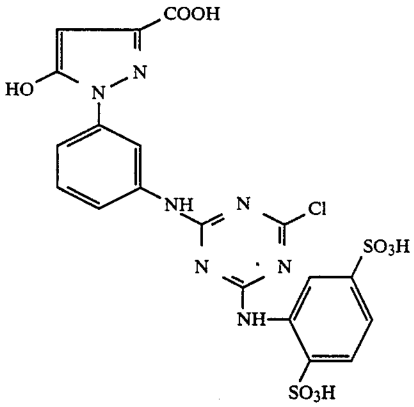 | yellow |
| 137 | 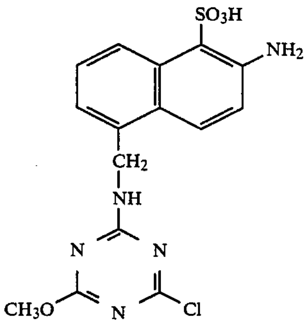 | 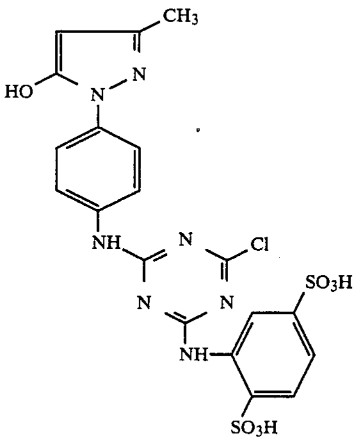 | yellow |
| 138 | 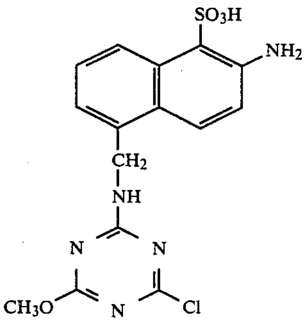 | 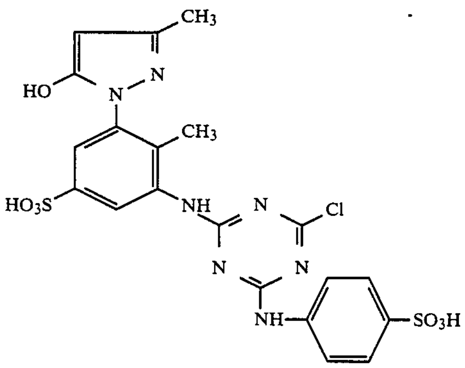 | yellow |

-continued
| Example | Column 1 | Column 2 | Column 3 |
|---|---|---|---|
| | | 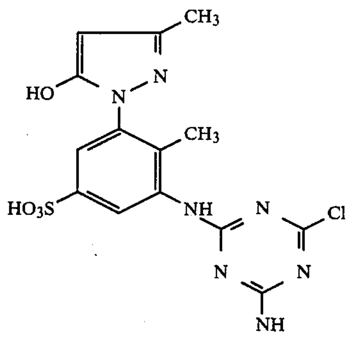 | yellow |
| 139 | 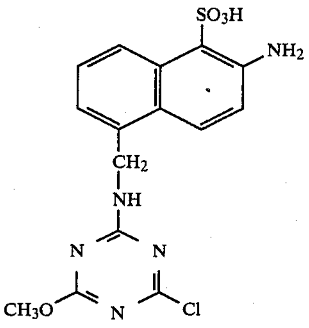 | 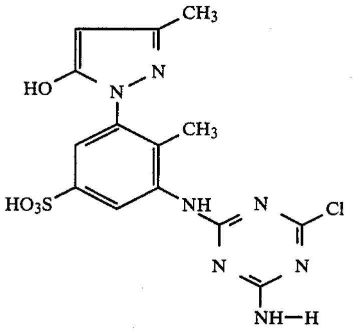 | yellow |
| 140 | 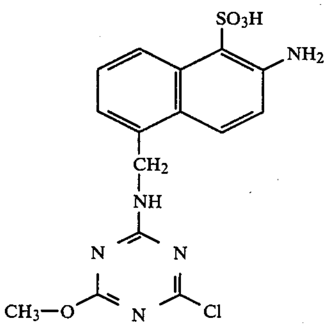 | 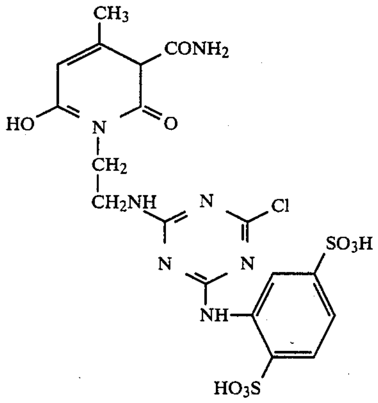 | strongly greenish-tinged yellow |
| 141 | 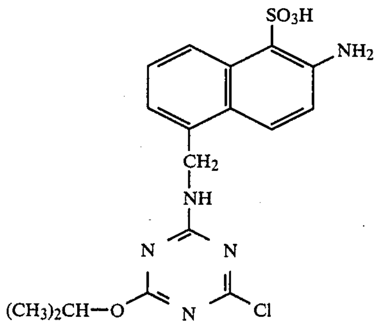 | 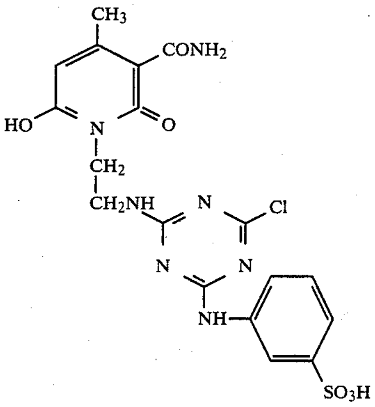 | strongly greenish-tinged yellow |

-continued
| Example | Column 1 | Column 2 | Column 3 |
|---|---|---|---|
| 142 | 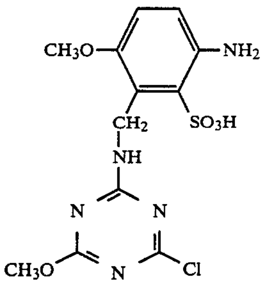 | 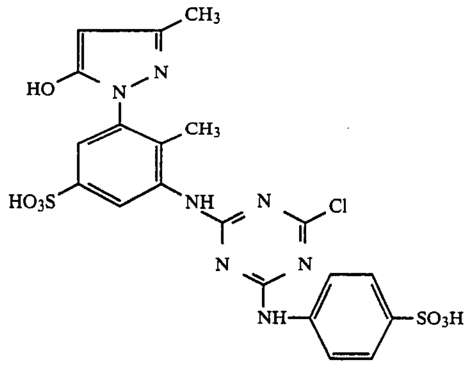 | reddish-tinged yellow |
| 143 | 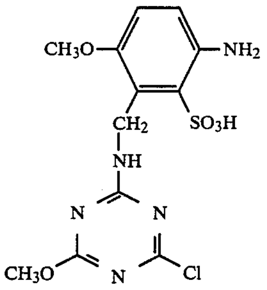 | 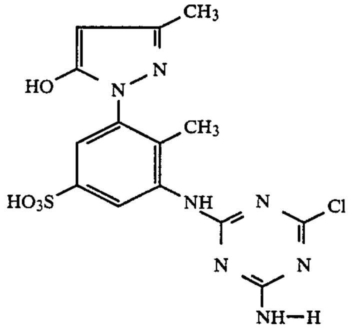 | reddish-tinged yellow |
| 144 | 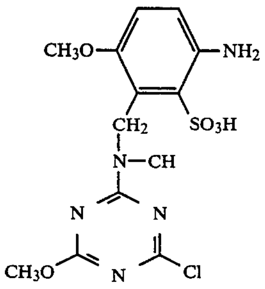 | 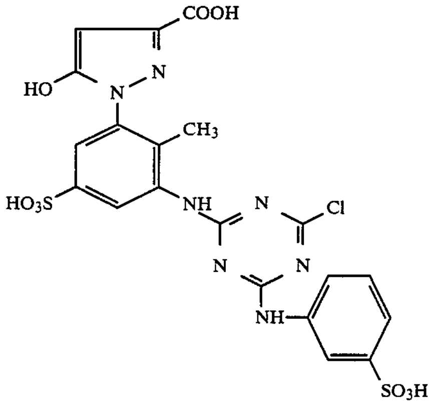 | reddish-tinged yellow |
| 145 | 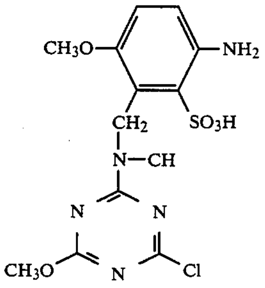 | 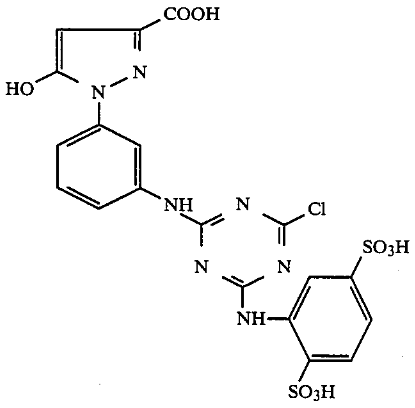 | reddish-tinged yellow |

-continued
| Example | Column 1 | Column 2 | Column 3 |
|---|---|---|---|
| 146 | 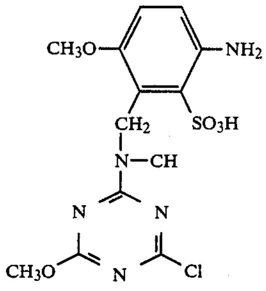 | 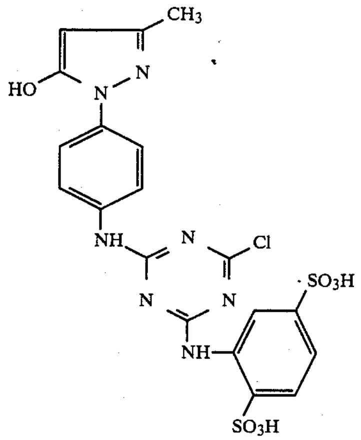 | reddish-tinged yellow |
| 147 | 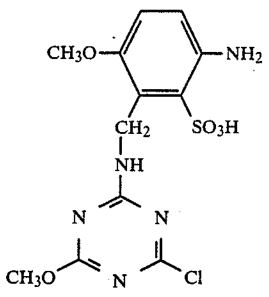 | 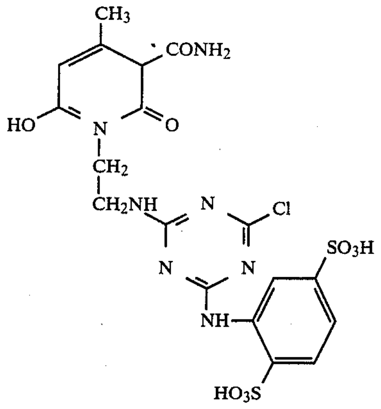 | greenish-tinged yellow |
| 148 | 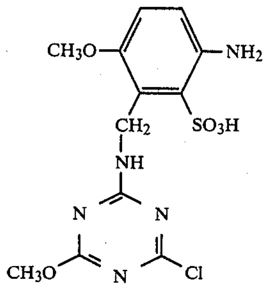 | 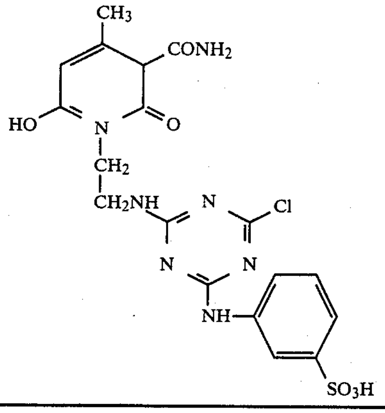 | greenish-tinged yellow |
EXAMPLE 149
80 g of the dyestuff of the formula

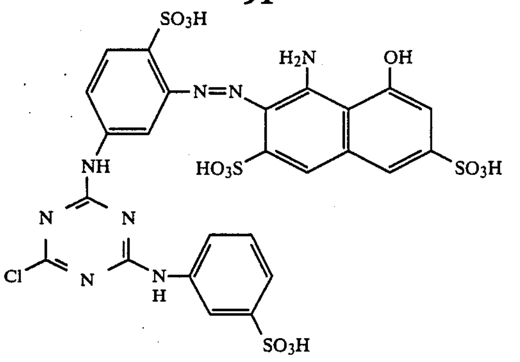

are dissolved in 500 ml of water and 28 g of sodium bicarbonate are added. To this mixture is added dropwise a suspension of a diazo compound which is obtained by diazotising 36 g of the amine of the formula

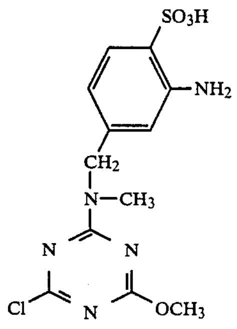

After completion of coupling, the dyestuff is salted out, filtered off, dried and ground. A dark blue powder is obtained, which readily dissolves in water, giving a blue colour. Using one of the application methods mentioned in conjunction with Example 1, the dyestuff gives blue-black dyeings and prints, of high wet fastness, on cotton.

EXAMPLE 150

46.6 g of the monoazo dyestuff 2-sulpho-5-N-methylaminomethyl-benzene(1 azo 2)1-hydroxy-3-sulpho-6-aminonaphthalene are stirred with 500 ml of water and 36 g of 2,4-dichloro-6-methoxy-triazine are added. The condensation is first carried out at pH 8.5 and 5°-10° C., and subsequently the mixture is warmed to 40°-45° C. and the pH is kept at 7 by means of 10% strength sodium carbonate solution. After completion of condensation, the dyestuff is salted out with sodium chloride, filtered off, dried and ground.

The powder readily dissolves in water, giving a yellowish-tinged orange colour, and when used in accordance with one of the application methods mentioned gives clear yellowish-tinged orange shades on cotton. In the form of the free acids the dyestuff corresponds to the formula

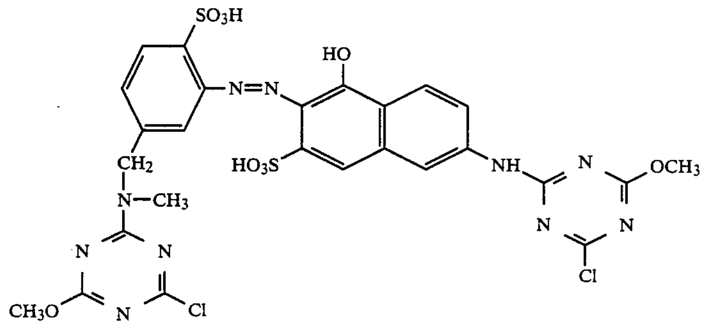

If the instructions of the present example are followed, but instead of 2,4-dichloro-6-methoxy-triazine the triazines mentioned below are employed, valuable dyestuffs are again obtained. The relevant triazines are: 2,4-dichloro-6-ethoxy-triazine, 2,4-dichloro-6-isopropoxytriazine and 2,4-dichloro-6-methoxyethoxy-triazine.

EXAMPLE 151

74.5 g of the dyestuff 2-sulpho-5-N-methylaminomethylbenzene<1 azo 2>1-amino-8-hydroxy-3,6-disulphonaphthalene<7 azo 1>2-sulpho-5-amino-benzene are stirred with 500 ml of water and 42 g of 2,4-dichloro-6-methoxy-ethoxy-triazine are added. The condensation is first carried out at pH 8.5 and 5°-10°, after which the mixture is warmed to 40°-45° C. whilst keeping the pH at 7 with 20% strength sodium carbonate solution. After completion of condensation, the dyestuff is salted out, filtered off, dried and ground. It corresponds to the formula

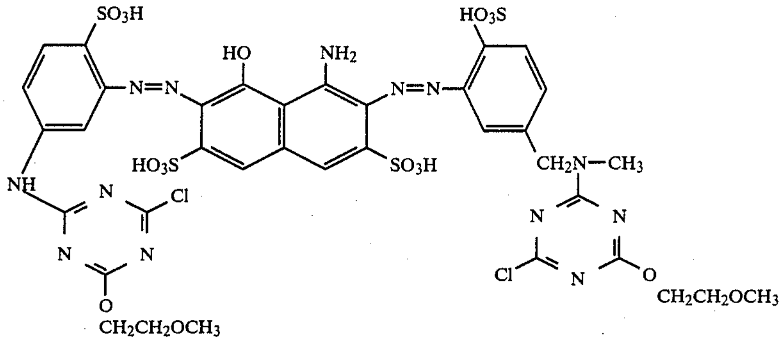

Valuable dyestuffs are also obtained if instead of 2,4-dichloro-6-methoxy-ethoxy-triazine an equivalent amount of 2,4-dichloro-6-ethoxy-triazine or 2,4-dichloro-6-isopropoxy-triazine is employed.

We claim:

1. A dyestuff of the formula

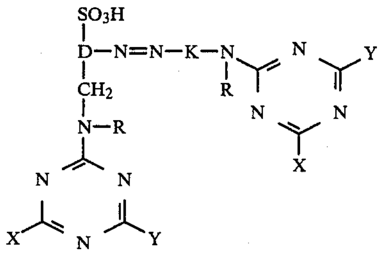

wherein

- D is a radical of a benzene or naphthalene coupling component, having a sulpho group in the o-position to the azo bridge,
- K is a radical of a hydroxy-naphthalene or pyrazolone coupling component,
- R is hydrogen or $C_1$–$C_4$-alkyl,
- Y is $OR_1$ or $SR_1$, wherein $R_1$ represents unsubstituted $C_1$–$C_4$-alkyl; $C_1$–$C_4$-alkyl substituted by methoxy or ethoxy; unsubstituted aryl; aryl substituted by chlorine or methoxy; unsubstituted heteroaryl; heteroaryl substituted by chlorine or methoxy; or
- Y is $NR_2R_3$, wherein $R_2$ represents hydrogen; unsubstituted alkyl; alkyl substituted by OH, $OCH_3$, COOH or $SO_3H$; $R_3$ represents hydrogen; unsubstituted alkyl; alkyl substituted by OH or $OCH_3$, unsubstituted aryl; aryl substituted by chlorine, methoxy, methyl, $SO_3H$ or COOH; or
- $R_2$ and $R_3$ form a ring without or with inclusion of a hetero atom;
- X is fluorine.

2. A dyestuff of the formula

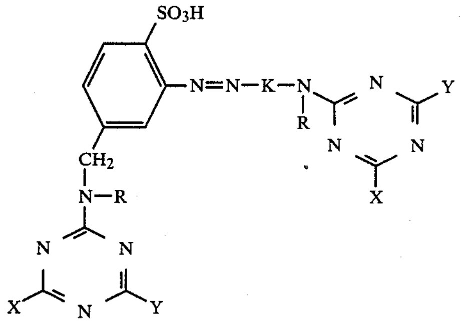

wherein K, R, X and Y have the meaning given in claim 1.

3. A dyestuff of the formula

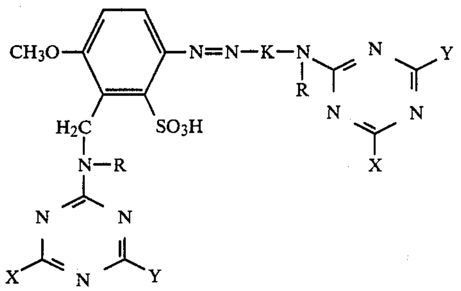

wherein K, R, X and Y have the meaning given in claim 1.

4. A dyestuff of the formula

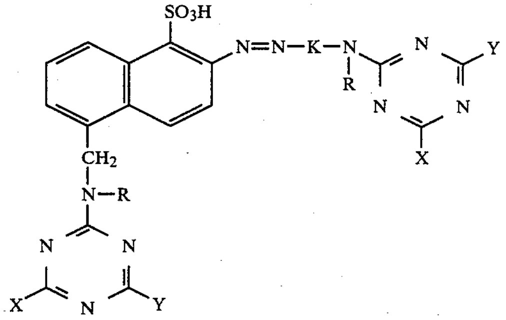

wherein K, R, X and Y have the meaning given in claim 1.

5. A dyestuff of the formula

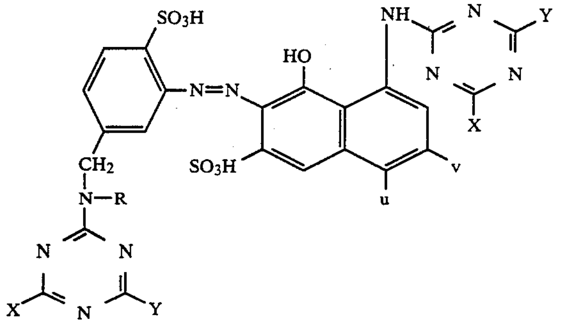

wherein

R, X and Y have the meaning given in claim 1 and u and v represent hydrogen or sulpho, but u≠v.

6. A dyestuff of the formula

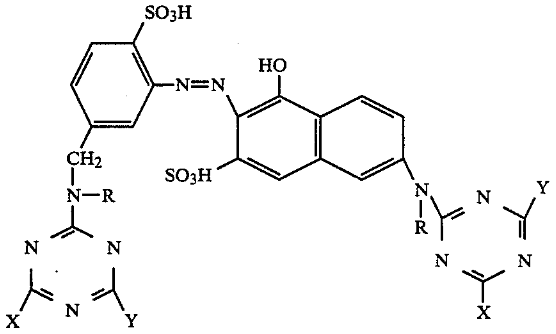

wherein R, X and Y have the meaning given in claim 1.

7. A dyestuff of the formula

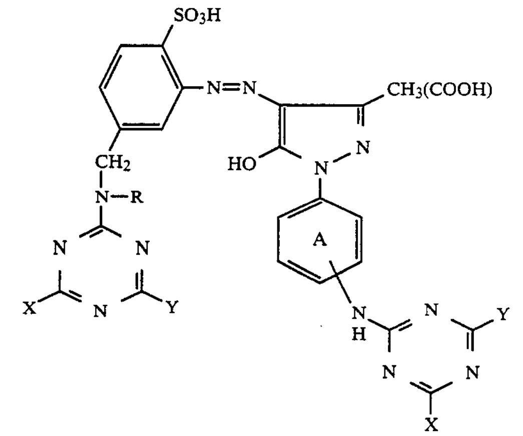

wherein

R, X and Y have the meaning given in claim 1 and the ring A is unsubstituted or substituted by chlorine, methyl or sulpho.

8. A dyestuff of the formula

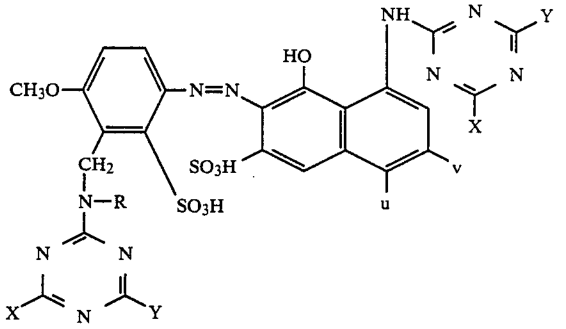

wherein

R, X and Y have the meaning given in claim 1 and u and v represent hydrogen or sulpho, but u≠v.

9. A dyestuff of the formula

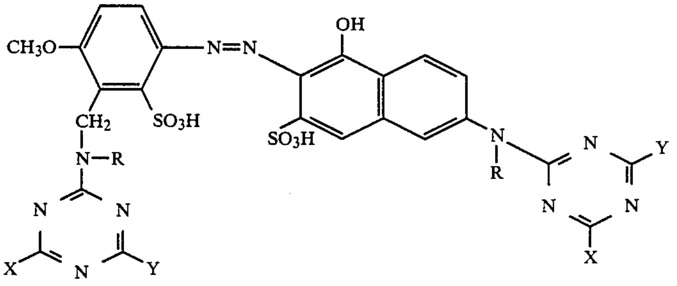

wherein R, X and Y have the meaning given in claim 1.

10. A dyestuff of the formula

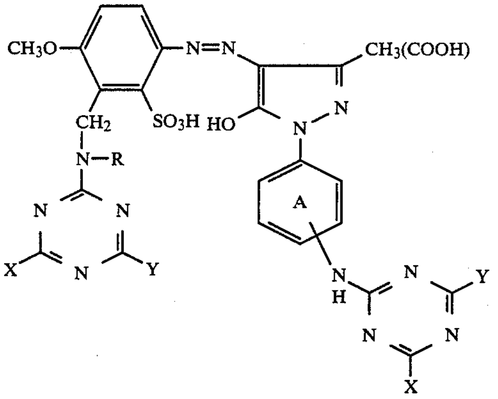

wherein

R, X and Y have the meaning given in claim 1 and the ring A is unsubstituted or substituted by chlorine, methyl or sulpho.

11. A dyestuff of the formula

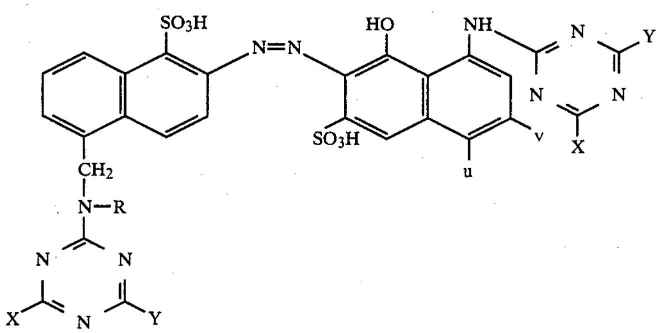

wherein

R, X and Y have the meaning given in claim 1 and u and v represent hydrogen or sulpho, but u≠v.

12. A dyestuff of the formula

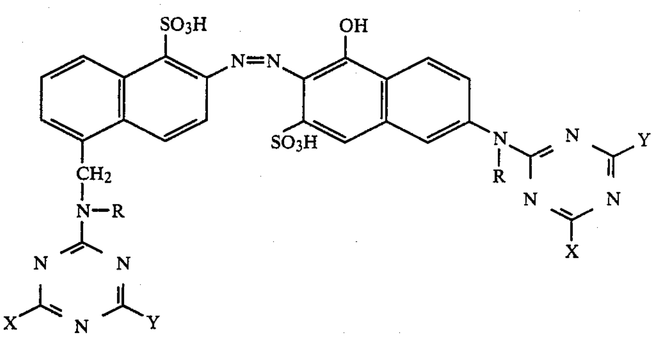

wherein R, X and Y have the meaning given in claim 1.

13. A dyestuff of the formula

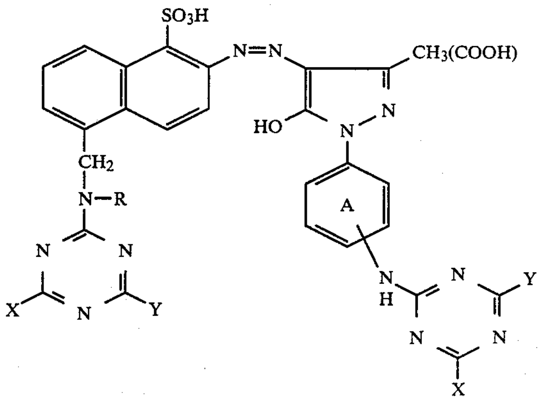

wherein

R, X and Y have the meaning given in claim 1 and the ring A is unsubstituted or substituted by chlorine, methyl or sulpho.

14. A dyestuff of the formula

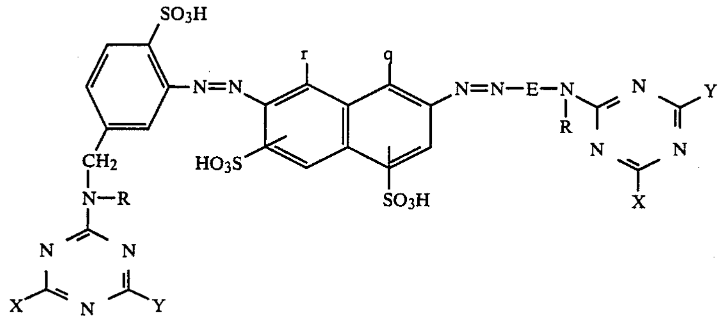

wherein

R, X and Y have the meaning given in claim 1 and r and q represent OH or $NH_2$, but $r \neq q$ and E represents monosulpho- or disulpho-phenylene or -naphthylene.

15. A dyestuff of the formula

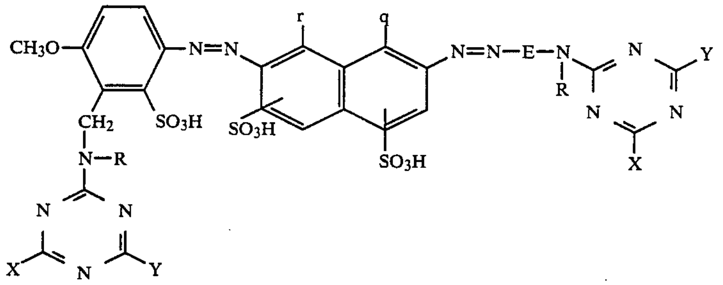

wherein

R, X and Y have the meaning given in claim 1 and r and q represent OH or $NH_2$, but $r \neq q$ and E represents monosulpho- or disulpho-phenylene or -naphthylene.

16. A dyestuff of the formula

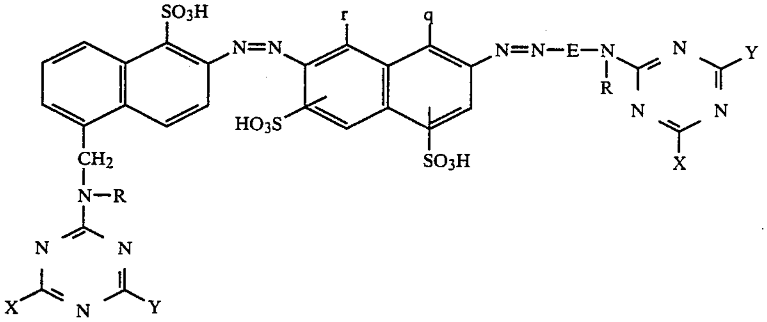

wherein

R, X and Y have the meaning given in claim 1 and r and q represent OH or $NH_2$, but $r \neq q$ and E represents monosulpho- or disulpho-phenylene or -naphthylene.

17. A dyestuff of claim 1, wherein R represents hydrogen or methyl.

* * * * *

UNITED STATES PATENT AND TRADEMARK OFFICE
CERTIFICATE OF CORRECTION

PATENT NO. : 4,748,236

DATED : May 31, 1988

INVENTOR(S) : Horst Jäger, et al

It is certified that error appears in the above-identified patent and that said Letters Patent is hereby corrected as shown below:

| | |
|---|---|
| Title Page, under "U.S. Patent Documents, line 5 | Delete "Jager" and substitute --Jäger-- |
| Col. 2, line 16 | Delete "disulfphonic" and substitute --disulphonic-- |
| Col. 38, line 46 | Delete "dissolved" and substitute --dissolves-- |
| Col. 68, Table, Col. 2, Examples 95, 96; Col. 70, Table, Col. 2, Examples 97, 98, 99 | Insert at beginning of formula in each case -- 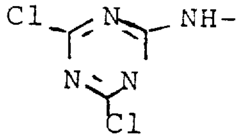 -- |
| Col. 70, Table, Col. 2, Examples 102, 103, 104, 105; Col. 71, Table, Col. 2, Examples 106, 107 | Insert at beginning of formula in each case -- 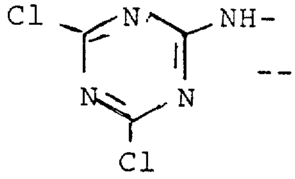 -- |
| Col. 71, Table, Col. 2, Examples 109, 110, 111, 112, 113 | Insert at beginning of formula in each case -- 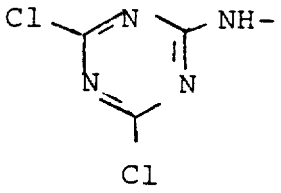 -- |

UNITED STATES PATENT AND TRADEMARK OFFICE
CERTIFICATE OF CORRECTION

PATENT NO. : 4,748,236

DATED : May 31, 1988

INVENTOR(S) : Horst Jäger, et al

It is certified that error appears in the above-identified patent and that said Letters Patent is hereby corrected as shown below:

| | |
|---|---|
| Col. 77, Table, Example 125, Col. 1 | Add at beginning of formula --$CH_3$-O- -- |

Signed and Sealed this

Tenth Day of January, 1989

*Attest:*

DONALD J. QUIGG

*Attesting Officer*

*Commissioner of Patents and Trademarks*